US008762184B2

(12) United States Patent
Rayner

(10) Patent No.: US 8,762,184 B2
(45) Date of Patent: Jun. 24, 2014

(54) SYSTEM AND METHOD FOR PRESENTING PRICING INFORMATION FOR ONLINE TRAVEL PRODUCTS AND SERVICES

(75) Inventor: Maximillian Rayner, Palo Alto, CA (US)

(73) Assignee: Travelzoo Inc., New York, NY (US)

( * ) Notice: Subject to any disclaimer, the term of this patent is extended or adjusted under 35 U.S.C. 154(b) by 468 days.

(21) Appl. No.: 12/693,434

(22) Filed: Jan. 25, 2010

(65) Prior Publication Data

US 2010/0198628 A1 Aug. 5, 2010

Related U.S. Application Data

(60) Provisional application No. 61/146,957, filed on Jan. 23, 2009.

(51) Int. Cl.
*G06Q 10/00* (2012.01)

(52) U.S. Cl.
USPC .......... 705/5

(58) Field of Classification Search
USPC .......... 705/5–6
See application file for complete search history.

(56) References Cited

U.S. PATENT DOCUMENTS 6,609,098 B1 * 8/2003 DeMarcken .......... 705/6
7,277,918 B2 10/2007 Lunenfeld
7,421,468 B2 9/2008 Lunenfeld
7,490,091 B2 2/2009 Lunenfeld
2001/0051876 A1 * 12/2001 Seigel et al. .......... 705/1
2002/0065688 A1 * 5/2002 Charlton et al. .......... 705/5
2002/0174205 A1 * 11/2002 Nakashima .......... 709/221
2003/0208387 A1 11/2003 Russell et al.
2004/0078252 A1 * 4/2004 Daughtrey et al. .......... 705/5
2004/0230451 A1 * 11/2004 Figa .......... 705/1
2004/0249683 A1 * 12/2004 Demarcken et al. .......... 705/5
2005/0021424 A1 * 1/2005 Lewis et al. .......... 705/27
2005/0086087 A1 * 4/2005 Razza et al. .......... 705/5
2005/0108069 A1 * 5/2005 Shiran et al. .......... 705/5
2007/0260526 A1 11/2007 Bartel
2008/0091482 A1 4/2008 Whitsett et al.

FOREIGN PATENT DOCUMENTS

WO WO 00/46732 A1 8/2000
WO WO2010085365 A1 7/2010

OTHER PUBLICATIONS

International Search Report and Written Opinion of the International Searching Authority in International Application PCT/US10/00204, ISA/US, Mar. 17, 2010, 10 pgs.
International Preliminary Report on Patentability of Aug. 4, 2011 in International Application PCT/US2010/000204.

* cited by examiner

*Primary Examiner* — Tonya Joseph
(74) *Attorney, Agent, or Firm* — Mahamedi Paradice Kreisman LLP

(57) ABSTRACT

The disclosure pertains to a computer-implemented method for presenting search results for airfares. One or more processors prompt a user to enter travel criteria for airfares on a calendar start interface to identify (i) the point of departure and (ii) the destination. The processor(s) display a sequenced calendar interface including a departure calendar, which includes a plurality of departure dates, each of which include pricing information indicating a lowest price roundtrip fare available on that departure date between the point of departure and the destination. A return calendar is displayed that includes a plurality of return dates that span multiple weeks, each of the plurality of return dates being displayed with pricing information indicating a lowest price roundtrip fare that departs on the selected departure date and returns on that return date.

4 Claims, 24 Drawing Sheets

400

| Refine Results | Sponsored Result | Take-off | Land | Stops | Duration | Cabin |
|---|---|---|---|---|---|---|
| San Francisco (SFO) to New York (NYC) 01/21/2009 to 01/28/2009 1 traveler Modify or start new search | $299 | AA American Airlines | SFO 07:50a ➡ JFK 04:15p 0 5h 25m Eco<br>JFK 07:05a ➡ SFO 10:45a 0 6h 40m Eco | | | |
| | See More... | Only on AA: In flight wireless Internet on select JFK-SFO flights | | | | |

Stops ⓘ

|  | | Best |
|---|---|---|
| ☑ | nonstop | $269 |
| ☑ | 1 stop | $280 |
| ☑ | 2+ stops | $523 |

Flight Time ⓘ

Leave ☑ take off ☐ landing
take off: 12:35a - 11:20p

Return ☑ take off ☐ landing
take off: 5:45a - 7:30p

Airlines ⓘ

Cabin Types ⓘ select all  clear                  Best
☑ Economy only          $269
☑ Premium Economy only   -
☑ Business only          $1110
☑ First only              $1619
Allow multiple cabin types? ☑

Price ⓘ
$269 to $5449

Trip Duration ⓘ
5h 08m to 11h 44m

Layover Duration ⓘ
30m to 3h 49m

23 Layover airports. Exclude? ☐

| Summary | List | Matrix |
|---|---|---|

ⓘ This Summary Display allows you to see the best Economy and Premium fares for all airlines. Use the filters to the left to refine your results, or click here to see a list of all flights.

Starting at          604 of 604 results

Economy ◊  Premium*                                614

| $269 | $1640 | ▲ | Delta Air Lines | 119 results | why me? |
| $269 | n/a | jetBlue | JetBlue Airways | 4 results | |
| $269 | $1619 | ///  | United Airlines | 139 results | 614 |
| $269 | $1969 | | Virgin America | 42 results | why me? |

Pilot your in-flight entertainment                close X

Pilot your in-flight entertainment with your own 9-inch screen. Plus, every seat comes with a standard power outlet for your personal gadgets.
Learn more at VirginAmerica.com

| $309 | $2792 | nwa | Northwest Airlines | 28 results | 616 |
| $312 | $1632 | | US Airways | 50 results | |

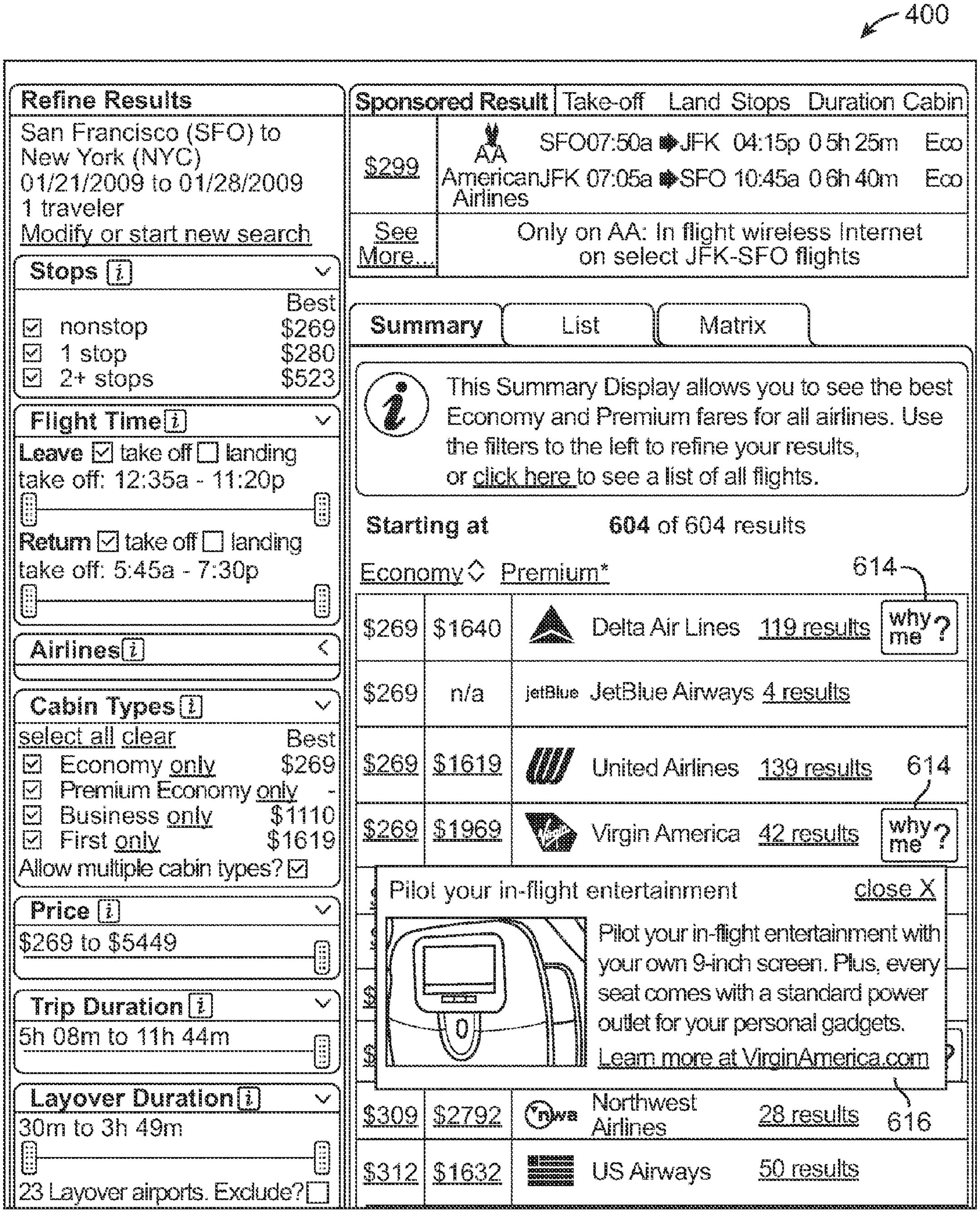

FIG. 6A

Refine Results
San Francisco (SFO) to
New York (NYC)
01/21/2009 to 01/28/2009
1 traveler
Modify or start new search Stops ⓘ

|  | Best |
|---|---|
| ☑ nonstop | $269 |
| ☑ 1 stop | $280 |
| ☑ 2+ stops | $523 |

Flight Time ⓘ
Leave ☑ take off ☐ landing
take off: 12:35a - 11:20p

Return ☑ take off ☐ landing
take off: 5:45a - 7:30p

Airlines ⓘ

Cabin Types ⓘ
select all clear          Best
☑ Economy only          $269
☑ Premium Economy only   -
☑ Business only        $1110
☑ First only           $1619
Allow multiple cabin types? ☑

---

Sponsored Result | Take-off  Land  Stops  Duration  Cabin $299 | AA American Airlines | SFO 07:50a ➡ JFK 04:15p  0 5h 25m  Eco
             JFK 07:05a ➡ SFO 10:45a  0 6h 40m  Eco See More... | Only on AA: In flight wireless Internet on select JFK-SFO flights

Summary | List | Matrix

ⓘ This Summary Display allows you to see the best Economy and Premium fares for all airlines. Use the filters to the left to refine your results, or click here to see a list of all flights.

Starting at          604 of 604 results                 ⟵ 400
Economy◇  Premium*

Delta on Demand                              close X

Delta on Demand, the airline's advanced touch-screen digital entertainment system, is available on select aircraft flying between NYC and SFO. You have a choice of up to 28 new and classic films, up to 60 hours of HBO on Demand, more than 3,500 MP3s, a suite of video games, and more.
Click here to learn more at Delta.com

616

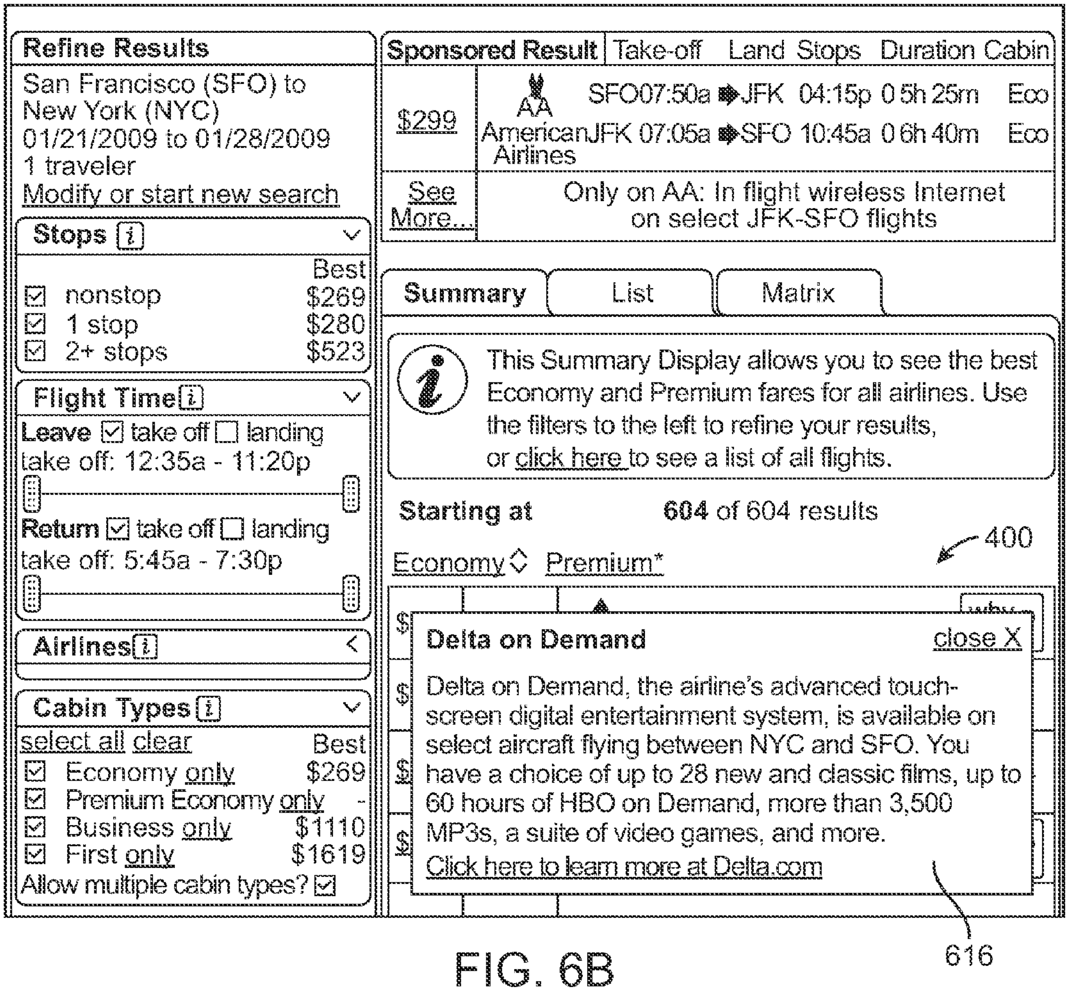

FIG. 6B

1) Pick departure date

| January $155 | February $155 | | March $155 | | April $179 | |
|---|---|---|---|---|---|---|
| Sun | Mon | Tue | Wed | Thu | Fri | Sat |
|  |  |  |  |  | Jan 1 | 2 |
| 3 | 4 | 5 | 6 | 7 | 8 | 9 |
| 10 | 11 $171 | 12 $171 | 13 $209 | 14 $209 | 15 $287 | 16 $260 |
| 17 $209 | 18 $167 | 19 $155 | 20 $155 | 21 $167 | 22 $182 | 23 $167 |
| 24 $182 | 25 $167 | 26 $155 | 27 $155 | 28 $167 | 29 $177 | 30 $167 |
| Jan 31 $177 | Feb 1 $167 | 2 $155 | 3 $155 | 4 $167 | 5 $177 | 6 $167 |

1) Pick departure date

| January $155 | February $155 | March $155 | April $179 |
|---|---|---|---|

| Sun | Mon | Tue | Wed | Thu | Fri | Sat |
|---|---|---|---|---|---|---|
|  |  |  |  |  | Jan 1 | 2 |
| 3 | 4 | 5 | 6 | 7 | 8 | 9 |
| 10 $171 | 11 $171 | 12 $209 | 13 $209 | 14 $209 | 15 $287 | 16 $260 |
| 17 $209 | 18 $167 | 19 $155 | 20 $155 | 21 $167 | 22 $182 | 23 $167 |
| 24 $182 | 25 $167 | 26 $155 | 27 $155 | 28 $167 | 29 $177 | 30 $167 |
| Jan 31 $177 | Feb 1 $167 | 2 $155 | 3 $155 | 4 $167 | 5 $177 | 6 $167 |

2) Pick return date

| January $155 | February $155 |
|---|---|

| Sun | Mon | Tue | Wed | Thu | Fri | Sat |
|---|---|---|---|---|---|---|
|  |  |  |  |  | Jan 1 | 2 |
| 3 | 4 | 5 | 6 | 7 | 8 | 9 |
| 10 | 11 | 12 | 13 | 14 | 15 | 16 |
| 17 | 18 | 19 | 20 $155 | 21 $167 | 22 $182 | 23 $167 |
| 24 $182 | 25 $167 | 26 $155 | 27 $155 | 28 $167 | 29 $177 | 30 $167 |
| Jan 31 $177 | Feb 1 $167 | 2 $155 | 3 $155 | 4 check | 5 check | 6 check |

| **Compare Sites** (in new windows) ☐ Hotwire ☐ Priceline ☐ Orbitz ☐ CheapOair |
|---|

1410

1) Pick departure date

| January $97 | | February $130 | | March $171 | | April $171 |
|---|---|---|---|---|---|---|
| Sun | Mon | Tue | Wed | Thu | Fri | Sat |
| | | | | | Jan 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 $97 | 23 $97 |
| 24 $201 | 25 $201 | 26 $201 | 27 $203 | 28 $178 | 29 $107 | 30 $107 |
| Jan 31 $181 | Feb 1 $181 | 2 $181 | 3 $210 | 4 $186 | 5 $130 | 6 $186 |

1421

2) Pick return date

| January n/a | | | | | | |
|---|---|---|---|---|---|---|
| Sun | Mon | Tue | Wed | Thu | Fri | Sat |
| | | | | | Jan 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |
| Jan 31 | | | | | | |

| January $97 | February $130 | March $171 | April $171 |
|---|---|---|---|---|---|---|
| Sun | Mon | Tue | Wed | Thu | Fri | Sat |
| | | | | | Jan 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 $97 | 23 $97 |
| 24 $201 | 25 $201 | 26 $201 | 27 $203 | 28 $178 | 29 $107 | 30 $107 |

1421

1430

| January $97 | February $102 | | |
|---|---|---|---|---|---|---|
| Sun | Mon | Tue | Wed | Thu | Fri | Sat |
| | | | | | Jan 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 $97 | 23 $97 |
| 24 $198 | 25 $97 | 26 $97 | 27 $198 | 28 $198 | 29 $198 | 30 $198 |

1410

1) Pick departure date

| January $97 | February $130 | March $171 | April $171 |
|---|---|---|---|

| Sun | Mon | Tue | Wed | Thu | Fri | Sat |
|---|---|---|---|---|---|---|
| | | | | | Jan 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 $97 | 23 $97 |
| 24 $201 | 25 $201 | 26 $201 | 27 $203 | 28 $178 | 29 $107 | 30 $107 |

1430

1) Pick return date

| January $97 | February $102 | |
|---|---|---|

| Sun | Mon | Tue | Wed | Thu | Fri | Sat |
|---|---|---|---|---|---|---|
| | | | | | Jan 1 | 2 |
| 3 | 4 | 5 | 6 | 7 | 8 | 9 |
| 10 | 11 | 12 | 13 | 14 | 15 | 16 |
| 17 | 18 | 19 | 20 | 21 | 22 $299 | 23 $198 |
| 24 $198 | 25 $97 | 26 $97 | 27 $198 | 28 $198 | 29 $198 | 30 $198 |

FIG. 14C

| Exact Dates | Fare Calendars NEW! | 1510 |

Find the lowest fare between

[San Francisco, CA-San Francisco Intl (S] and [Kailua-Kona, HI - Kona Intl (KOA)] depart around [03/15/2010] 🗓 [Go]

1512                                                                                1516

1) Pick departure date                  2) Pick return date

| Sun | Mon | Tue | Wed | Thu | Fri | Sat |
|-----|-----|-----|-----|-----|-----|-----|
|     |     |     | n/a |     |     |     |
|     |     | 1   | 2   | 3   | 4   | 5   |
| 6   | 7   | 8   | 9   | 10  | 11  | 12  |
| 13  | 14  | 15  | 16  | 17  | 18  | 19  |
| 20  | 21  | 22  | 23  | 24  | 25  | 26  |
| 27  | 28  | 29  | 30  | 31  |     |     |

| Sun | Mon | Tue | Wed | Thu | Fri | Sat |
|-----|-----|-----|-----|-----|-----|-----|
|     |     |     | n/a |     |     |     |
|     |     | 1   | 2   | 3   | 4   | 5   |
| 6   | 7   | 8   | 9   | 10  | 11  | 12  |
| 13  | 14  | 15  | 16  | 17  | 18  | 19  |
| 20  | 21  | 22  | 23  | 24  | 25  | 26  |
| 27  | 28  | 29  | 30  | 31  |     |     |

This calendar displays prices based on roundtrip travel (including taxes and fees) for an adult passenger. Prices shown are the lowest based on recent searches by Fly.com users and may no longer be available. Fares are based on a 14-day travel window from the selected departure date, and they may vary depending on selected return date.

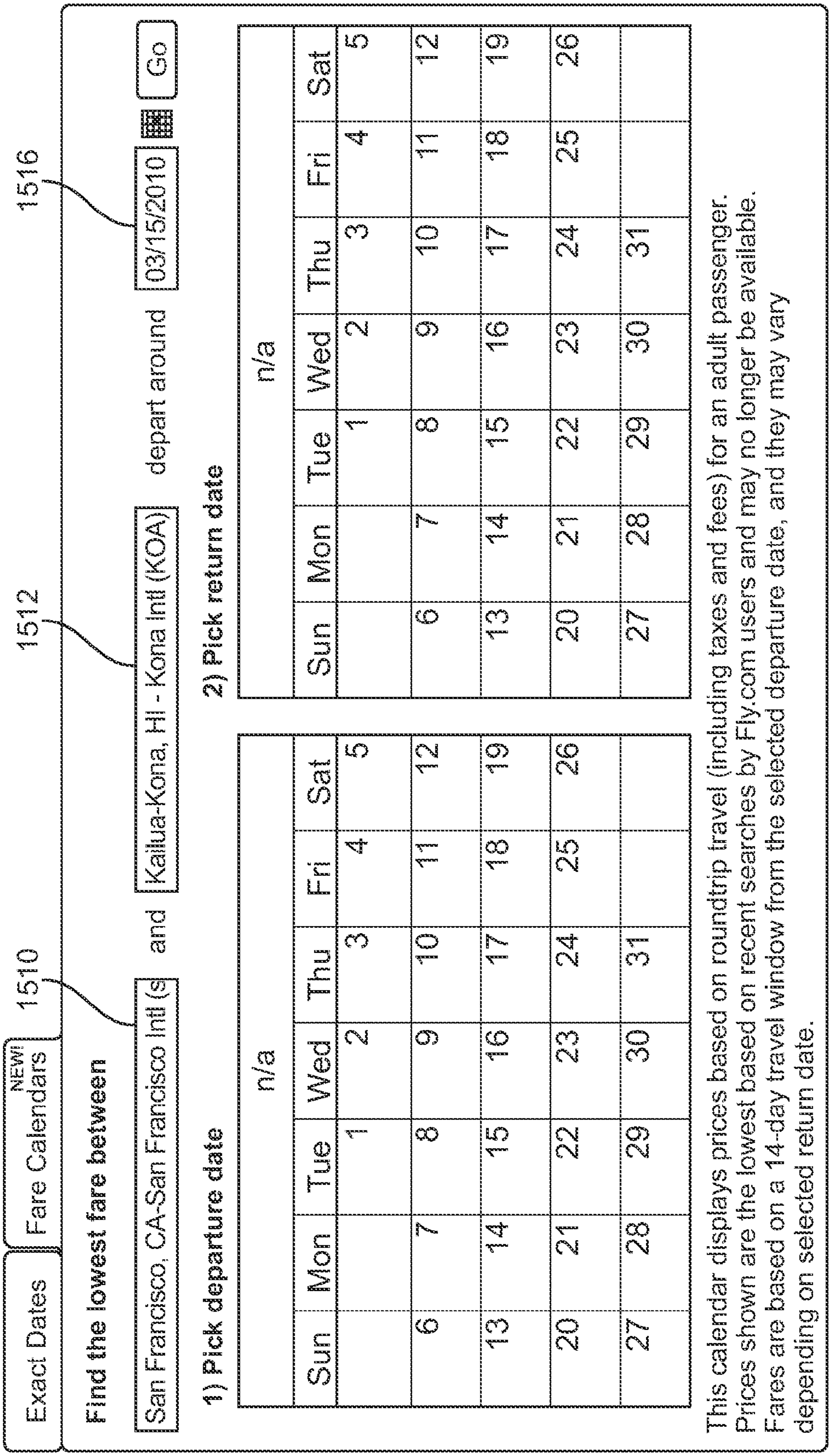

FIG. 15A

See the world. Search on Fly.™ close
Calendar best price: $207

| Summary | List | Matrix | Calendars |

ⓘ This view shows a snapshot of Economy and Premium (business or first) fares. Use the filters to the left to refine your search results, or click on the links below for more details from each airline. To see a list of all flights, click here.

Economy ⇕ Premium*                    941 of 941 results

| $217 | n/a | ▽ Midwest Airlines | see 13 results | why me? |
| $217 | n/a | ✈ Multiple Airlines | see 81 results | |
| $219 | $1320 | AA American Airlines | see 190 results | |
| $219 | $1621 | △ Delta Air Lines | see 152 results | why me? |
| $227 | $1621 | nwa Northwest Airlines | see 37 results | |
| $228 | $1088 | a AirTran | see 4 results | why me? |
| $229 | $1599 | ✈ United Airlines | see 72 results | |
| $240 | n/a | ◣ Frontier Airlines | see 5 results | |
| $241 | $1599 | ≡ US Airways | see 69 results | |
| $248 | $1619 | ◣ Continental Airlines | see 65 results | |
| $250 | $2265 | ▽ Virgin America | see 217 results | |
| $259 | n/a | jetBlue JetBlue Airways | see 14 results | |
| $442 | $1461 | ⓐ Alaska Airlines | see 22 results | |

*Best price with business or first class seating.
The lowest price in each column is displayed in green.

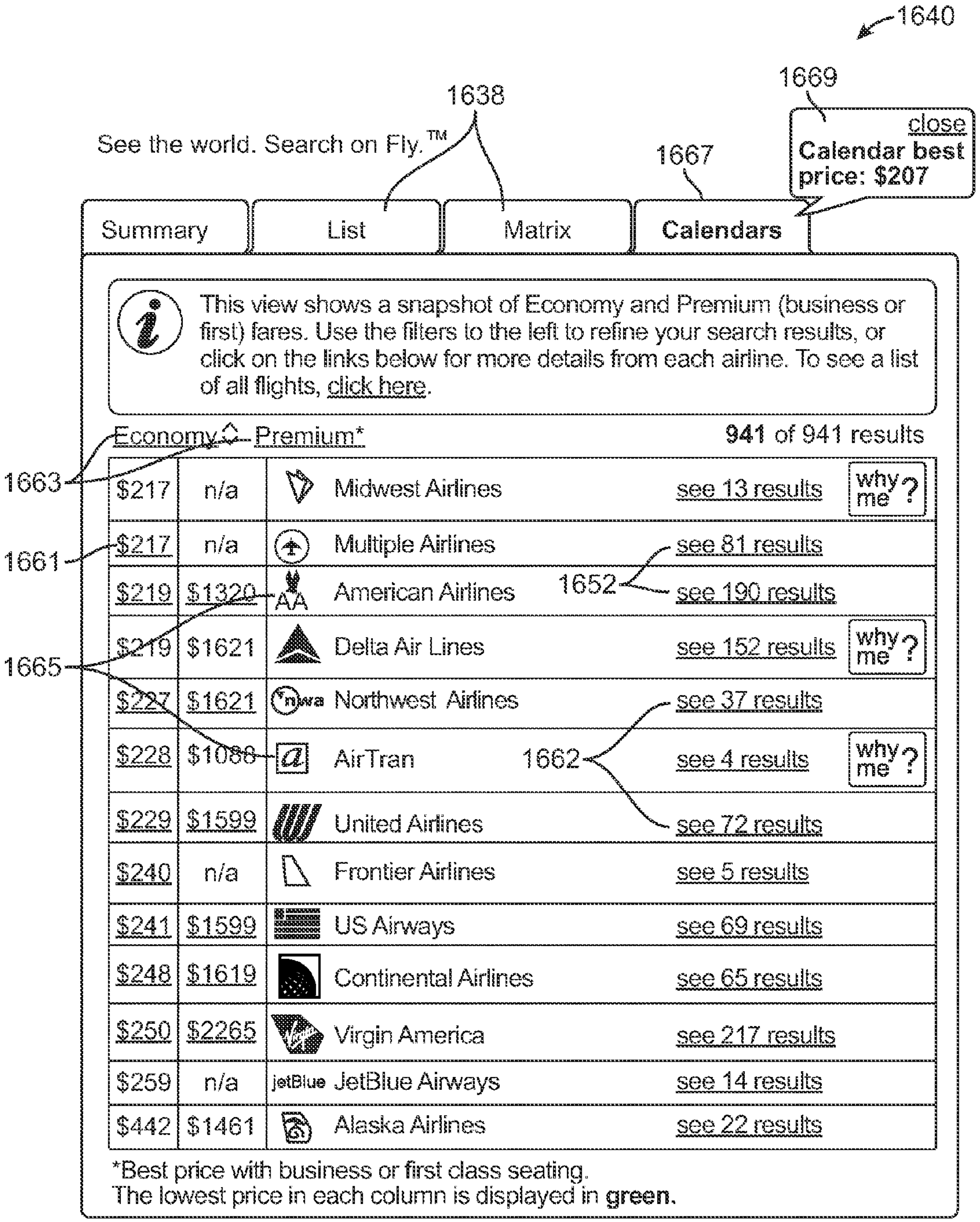

FIG. 16B

List Summary Matrix

1674

| | List of all flights | | AA American Airlines | US Airways | Hawaiian Airlines | Multiple Airlines | Continental Airlines |
|---|---|---|---|---|---|---|---|
| | All | United Airlines | | | | | |
| nonstop | $874 | $874 | | $1005 | | | $1654 |
| 1 stop | $573 | $814 | $573 | $730 | $734 | | $1664 |
| 2+ stops | $568 | $568 | $641 | $675 | | $775 | $1039 |
| scroll for more... | | | | | | | |

1672

673 of 673 results 1671 1 2 3 4 5 1650

FIG. 16C

$99 -- Weekends at Chicago Boutique Hotel (Reg. $249)*

Chicago
Travel dates: Thursday-Sunday through April 5; +$20 midweek

By Devon Mosley
*Travelzoo Staff*

Top 20 deal - sells out quickly!

1780

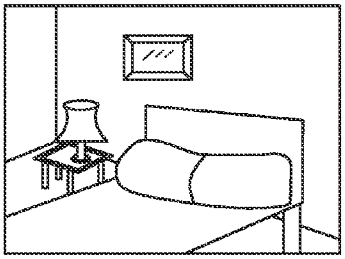

Located among Chicago's bustling North Loop theatre district, the boutique Hotel Allegro - A Kimpton Hotel is offering rooms for $99 per night. This deal is available Thursday-Sunday through April 5 with a complimentary bottle of wine upon arrival.

Stays Monday-Wednesday are $119 per night. Rates during this period reach up to $249.

This 4-star Kimpton property sits adjacent to the historic
Cadillac Place Theatre and recently completed a $40 million renovation.
Kimpton Hotels use eco-friendly products and services. so guests can feel
good about a stay here. In-room amenities include free wireless Internet access,
37-inch LCD HD flat-screen TVs and on-demand movies, Home docking stations
and Aveda bath products.
A daily wine reception and organic, Fair Trade coffee are available and compliment
Room.
Bonus: Suite upgrades are available for just 20.

Book by Jan. 15: Click here to book online, or call 800-643-1500 and mention ra

Cheap Roundtrip Fares to Chicago from: POWERED BY fly.com 1782
(Per person, including taxes and fees.
Click a price to verify availability now)

| | | | |
|---|---|---|---|
| Boston | $155 | San Francisco | $294 |
| Los Angeles | $224 | Washington, DC | $169 |
| New York | $139 | | more cities |

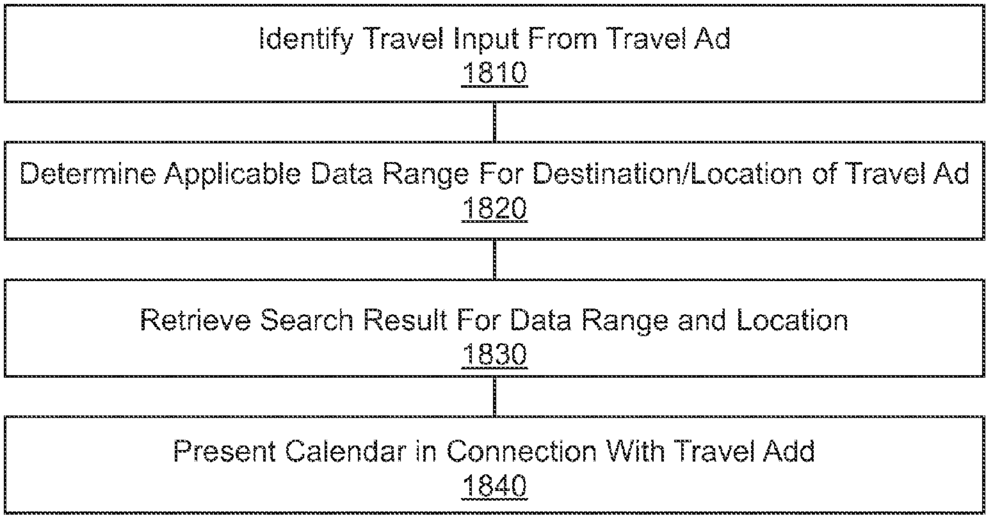

FIG. 18A

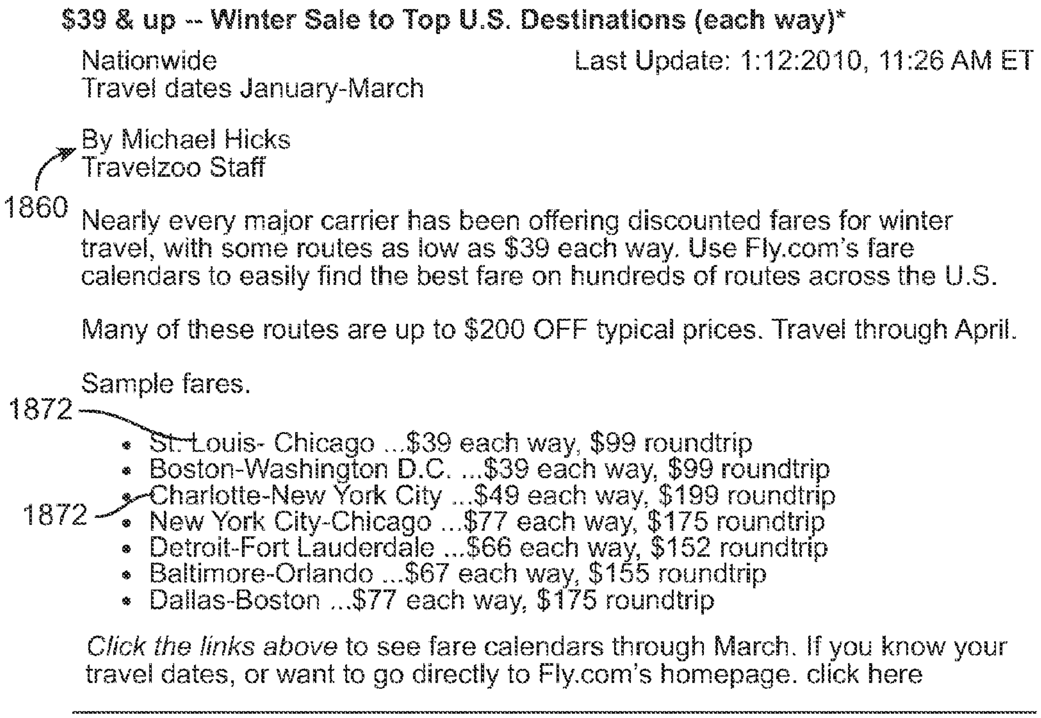

$39 & up -- Winter Sale to Top U.S. Destinations (each way)*

Nationwide
Travel dates January-March

Last Update: 1:12:2010, 11:26 AM ET

By Michael Hicks
Travelzoo Staff

Nearly every major carrier has been offering discounted fares for winter travel, with some routes as low as $39 each way. Use Fly.com's fare calendars to easily find the best fare on hundreds of routes across the U.S.

Many of these routes are up to $200 OFF typical prices. Travel through April.

Sample fares.

- St. Louis- Chicago ...$39 each way, $99 roundtrip
- Boston-Washington D.C. ...$39 each way, $99 roundtrip
- Charlotte-New York City ...$49 each way, $199 roundtrip
- New York City-Chicago ...$77 each way, $175 roundtrip
- Detroit-Fort Lauderdale ...$66 each way, $152 roundtrip
- Baltimore-Orlando ...$67 each way, $155 roundtrip
- Dallas-Boston ...$77 each way, $175 roundtrip

*Click the links above* to see fare calendars through March. If you know your travel dates, or want to go directly to Fly.com's homepage. click here

FIG. 18B

SYSTEM AND METHOD FOR PRESENTING PRICING INFORMATION FOR ONLINE TRAVEL PRODUCTS AND SERVICES

RELATED APPLICATIONS

This application claims benefit of priority to Provisional U.S. Patent Application No. 61/146,957; filed Jan. 23, 2009; the aforementioned priority application being hereby incorporated by reference in its entirety.

TECHNICAL FIELD

The disclosed embodiments relate generally to the field of online searching and product research.

BACKGROUND

The Internet has enabled numerous online searching sites for which individuals can search for products and services. These sites enable persons to search for and purchase or reserve various products and services. Persons can typically use these sites to search to comparison shop or find products or services that are tailored to specific wants of the user.

In the travel industry, numerous web sites exist for persons to make reservations and bookings. For airfare, for example, airlines typically have online sites that an individual can use to search for fares and purchase tickets. At the same time, numerous online travel agents exist, some of which combine data and fares from numerous airlines. These sites give the individual numerous choices, and can provide overlapping products and services.

BRIEF DESCRIPTION OF THE DRAWINGS

FIG. 6A shows a presentation, generated from a system such as described with FIG. 5, having a marker for displaying supplemental information.

FIG. 6B shows another presentation such as provided with FIG. 6A, using other kinds of supplemental information.

FIG. 14A through FIG. 14C illustrate calendar views that depict pricing information for a given route, in which the pricing information for a return leg (see FIG. 14B and FIG. 14C) depends on the selected departure date.

FIG. 15A and FIG. 15B illustrate a calendar-start interface, according to an embodiment.

FIG. 16A through FIG. 16C illustrates a multi-view presentation for presenting pricing information for products using search results, according to one or more embodiments.

FIG. 17 illustrates online content that includes a listing of pricing information with views such as described with one or more embodiments.

FIG. 18A and FIG. 18B illustrate an embodiment in which a promoted travel product is presented with a calendar view to display rates and information about the travel product, according to an embodiment

DETAILED DESCRIPTION

Figure 1:
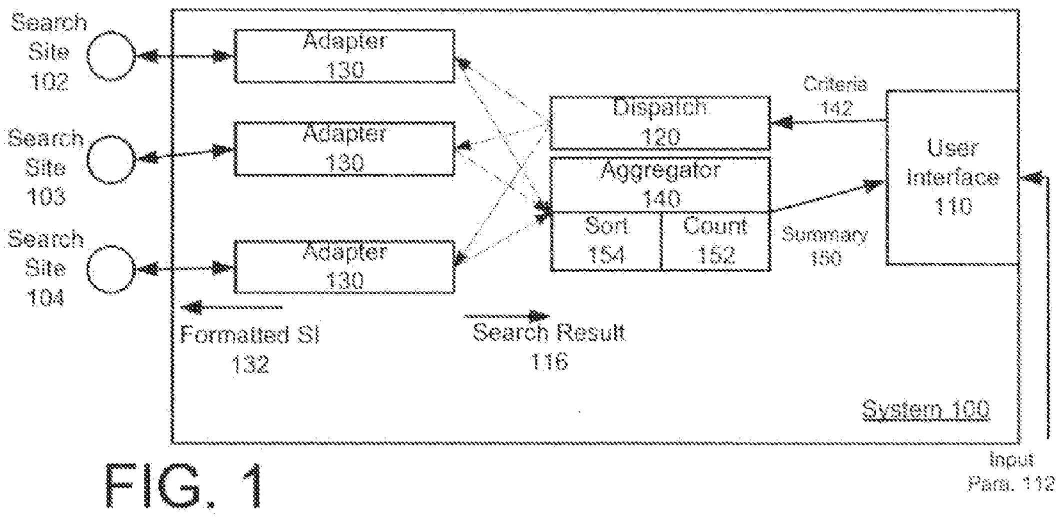
FIG. 1 illustrates a system for providing a summary view of search results for products or services, according to an embodiment.

In an online search environment, some embodiments described herein provide an interface that presents or provides a summary view of a search result for products or services. The summary view summarizes products or services that match search criteria by provider. In particular, the summary view identifies (i) individual providers that offer products or services that match the search criteria, and (ii) aggregates information that is descriptive of all (or many) products or services that match the search criteria of each identified provider. The aggregated information may be presented in visual association with the provider (e.g. tabular form), and may list price ranges and/or counts of the number of products/services of the provider that match the criteria.

Still further, embodiments described herein provide a system and method for presenting search results. In an embodiment, a user may interact with an online search interface, such as a meta-search engine web site, to enter search input that identifies one or more parameters for a desired product or service. The parameters may be used to identify search criteria for a search engine, or for multiple search engines. From the search engines, search results are determined that include a plurality of listings. Each listing (i) identifies a product or service, (ii) a provider of the product or service, and (iii) a price of the product or service. A summary of the one or more search results is then presented to the user. The summary includes a plurality of summary entries, and each summary entry identifies (i) the provider that provides at least some of the listings, and (ii) a range of the price of the listings provided by the provider of those listings.

Additional embodiments include listing alternative views for pricing information for various travel products. In some embodiments, a calendar view is utilized, that presents pricing information for travel products on numerous dates, where information about the travel products are aggregated from multiple different sources (e.g. multiple online booking engines) and can be provided from various providers (e.g. carriers).

As used herein, the term "product" applies to merchandise and services. In the context of travel, "product" may include items that can be purchased or reserved, depending on what the product is (e.g. airfare) and rules that apply for acquisition of the product by the consumer. With reference to the travel industry, product may include fares (airline, train, cruise line, bus etc.), lodging, local destination transport (e.g. car rental), organized travel services (e.g. guided expedition), travel packages that combine different types of services, travel products (airfare, train fare, bus fare, cruise fare, car rental and hotel accommodations), reservations (with or without booking) and various other products/services and variations thereof. While embodiments described herein are described with greater focus on travel products and fares, other embodiments may apply to other types of products. For example, embodiments described herein may apply to books or consumer electronics.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Architecture

FIG. 1 illustrates a system for providing a summary view of search results for products or services, according to an embodiment. A system 100 such as shown may be implemented in context of enabling a user to search online for a variety of products or services. In an embodiment, system 100 may be implemented to enable online searches for travel related products and services. Examples of such products and services include (i) airline tickets or seats, (ii) hotel reservations, and (iii) car rental, (iv) vacation packages, (v) train/bus fares, and (vi) cruise fares or packages. Embodiments described may readily extend to other products and services as well, such as merchandise (e.g. consumer electronics, apparel).

In an embodiment, system 100 is provided as a meta-search engine that can be accessed by users at a website, in order to enable users to research products and services using various different parameters. The system 100 interfaces with a plurality of search engines 102, 103 and 104 in order to identify products or services that satisfy the user's parameters from a variety of sources. Each search engine may enable searching of a class of products or services. In one implementation, each search engine is independently accessible over the Internet by the user for purpose of enabling the user to search for a product or service as provided by a particular provider or set of providers. For example, search engine 102 may be provided by one airline in order to enable a person to make reservations, to reserve or book a flight (purchase airline ticket or seat), or to make a travel itinerary (e.g. flight, lodging, and car rental for a given date). Search engine 103 or 104 may be provided by a booking engine for use with multiple airlines. Any of the search engines may themselves be a meta-search engine that searches more than one online source for a given class of products or services.

As depicted, system 100 includes a user interface 110, a dispatcher 120, one or more adapters 130, and an aggregation and analysis component 140. In more detail, the user interface 110 may be presented at a web site to enable the user to (i) specify input parameters 112 for a desired product or service, and to (ii) view results of one or more searches for products or services that satisfy the input parameters. Multiple parameters may be specified by the user. The user interface 110 uses the one or more parameters of the input 112 to communicate criteria 142 to dispatcher 120. The dispatcher 120 then communicates criteria 142 to one or more of the adapters 130.

In an embodiment, the dispatcher 120 includes logic to select adapters 130 for handing individual searches. The selection of adapters 130 may correspond to identifying which search engines 102-104 are suited for searching for products or services that can match the criteria 142. As an alternative or addition, the dispatcher 120 includes logic to discriminate or eliminate search engines that are likely to return unfavorable results to the user. For example, in the field of airline tickets or seats, the user's parameters may typically identify departure and destination. The dispatcher 120 may include logic and data that eliminates search engines that are unable to provide desirable airfares between the sites. For example, dispatcher 120 may eliminate search engines that offer no flights from providers that service the specific geographic region of the user's input.

As mentioned, one or more of search engines 102-104 may be operated and under control of a third party. Each adapter 130 is configured to interface system 100 with at least one of the search engines 102-104. For example, each adapter 130 may be configured to format and/or structure the search criteria 142 into a formatted search input 132 that is then signaled to the corresponding search engine 102-104. As search engines 102-104 may be operated outside of the domain where system 100 is provided, the individual adapters may be configured to signal the formatted search input 132 across a network that includes the Internet. For example, search criteria 142 may be formatted into search input 132 that is in an XML format by one of the adapters, and into HTML format by another. Other considerations for formatting the search criteria include, for example, sequencing or positioning the parameters specified by the user, or formatting specific parameters of the criteria. Each adapter 130 may then receive a search result 116 from a corresponding search engine 102-104. The search result 116 may correspond to a web resource, such as a web page or document. In one implementation, the adapter 130 handles the returned search result 116 and then communicates the search result to aggregator/analyzer 140. The aggregator/analyzer 140 parses each search result to identify listings. Each listing may identify a specific product or service, provided by a corresponding provider and at a particular price or price range. The aggregator/analyzer 140 may include logic to count, sort and analyze the listings of the search results 116 as returned from each search engine. A counter 152 of the aggregator/analyzer 140 may count the number of listings that are associated with a particular provider. A sorter 154 of the aggregator/analyzer 140 sorts the various listings by one or more parameters, such as by price, provider, or by other criteria. Analysis performed by the aggregator/analyzer 140 may, for example, remove duplicate listings as returned from the various search engines and incorporate other intelligence to identify, sort and count listings. With counter 152, sorter 154 and other logic, the aggregator/analyzer 140 may structure an output that provides a summary 150 of the listings (or at least a portion of the listings) by provider. Information that may be included in the summary 150 include entries that identify (i) a provider, and (ii) for each provider, a price range (e.g. lowest, highest) of a product or service that matches the input parameters. Other information that may be included with the summary entries, as an addition or alternative, include: (i) a count of listings (e.g. separate products or services) of a provider that match criteria identified from the user's inputs, (ii) identification of more than one product class (e.g. coach and business class for airline fares), with count and price range information, that satisfy the criteria or are otherwise deemed of interest.

The aggregator/analyzer 140 may display the summary 150 via the user interface 110. For example, the summary 150 may be displayed on a web page. As an alternative, the summary may be communicated through other channels, such as in form of an email or other message.

Methodology

Figure 2:
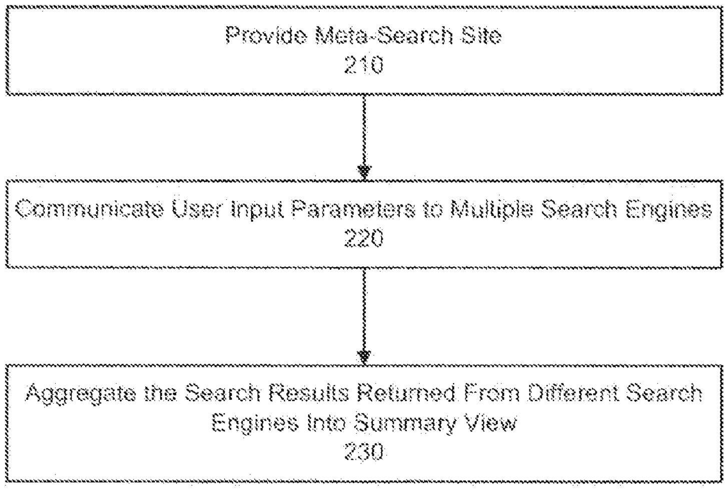
FIG. 2 illustrates a method for providing presenting results from an online search for products or services, according to an embodiment.

FIG. 2 illustrates a method for providing presenting results from an online search for products or services, according to an embodiment. A method such as described may be performed using, for example, a system of FIG. 1. Accordingly, reference may be made to elements cited with system 100, for purpose of illustrating a suitable step or sub-step that is performed.

In step 210, a user navigates to a web site and interfaces with a meta-search engine. The meta-search engine may implement a system such as described with FIG. 1. The user may specify input through an interface of the search engine in order to specify parameters from which criteria 142 may be identified for a product or service. As described below, the user may have ability to specify, for example, dates of interest that the (travel) product is needed, product class, and location information for the product (e.g. departure and destination for airlines, city of interest for car rental). Various other forms of information may be specified, such as, for example, price range or desirability parameters (e.g. specify non-stop or one stop for air passage, all inclusive for vacation package).

In step 220, the meta-search engine communicates the user's input parameters to multiple search engines 102-104 in order to receive search results. As mentioned, at least some of the search engines 102-104 may be operated independent and outside of the control of the meta-search engine, Logic, such as in the form of the components of dispatcher 120 and adapters 130, may execute to communicate the input parameters to the search engines 102-104.

In step 230, the meta-search engine aggregates the results returned from different search engines and returns an aggregated search result. The aggregated search result may be viewable in different forms. One form may correspond to summary view 150, which is also depicted with embodiments of FIG. 3 and FIG. 4. Other views may be presentable to the user as well: these include, for example, summary or list views, calendar views or chart views.

In an embodiment, the user can interact with the different views. With the summary view 150, the user can select each summary entry of a corresponding provider in order to view list entries that identify individual products or services of that provider, matching the input parameters of the user. Thus, the user is able to use the summary view to view products by provider, in condensed fashion.

Summary View

Figure 3:
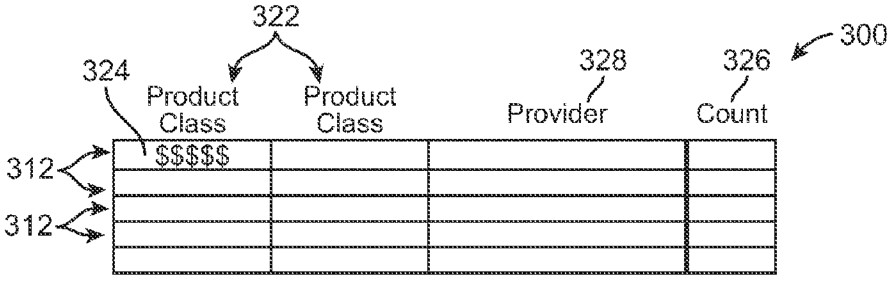
FIG. 3 illustrates a summary view for products or services, according to an embodiment.

FIG. 3 illustrates a summary view for products or services, according to an embodiment. A summary view 300 may be generated using a system such as described with FIG. 1, or method such as described with FIG. 2. In an embodiment, the summary view may include multiple summary entries 312 that each present information about individual products or services of a corresponding provider in aggregate form. The summary view enables the user to search for products or services using a search engine or a meta search engine, and to view results of the search(es) by provider, in summary form, so that meaningful information about individual products and services offered by the provider is conveyed to the user.

In one embodiment, the aggregate information displayed with each summary entry 312 includes some or all of the following: (i) multiple product classes 322 that match the parameters identified by the user (ii) pricing information 324 (for separate product classes, if displayed), (iii) the count 326 of the number of products or services the individual providers offer that match are deemed relevant to the input parameters of the user.

Still further, in an embodiment, the summary view 300 may be provided in tabular form. Accordingly, each summary entry 312 may correspond to, for example, a row in the table. The different kinds of aggregate information (product class 322, pricing information 324, count 326), along with the provider identifier 328, may be provided as columns in the table.

Figure 4:
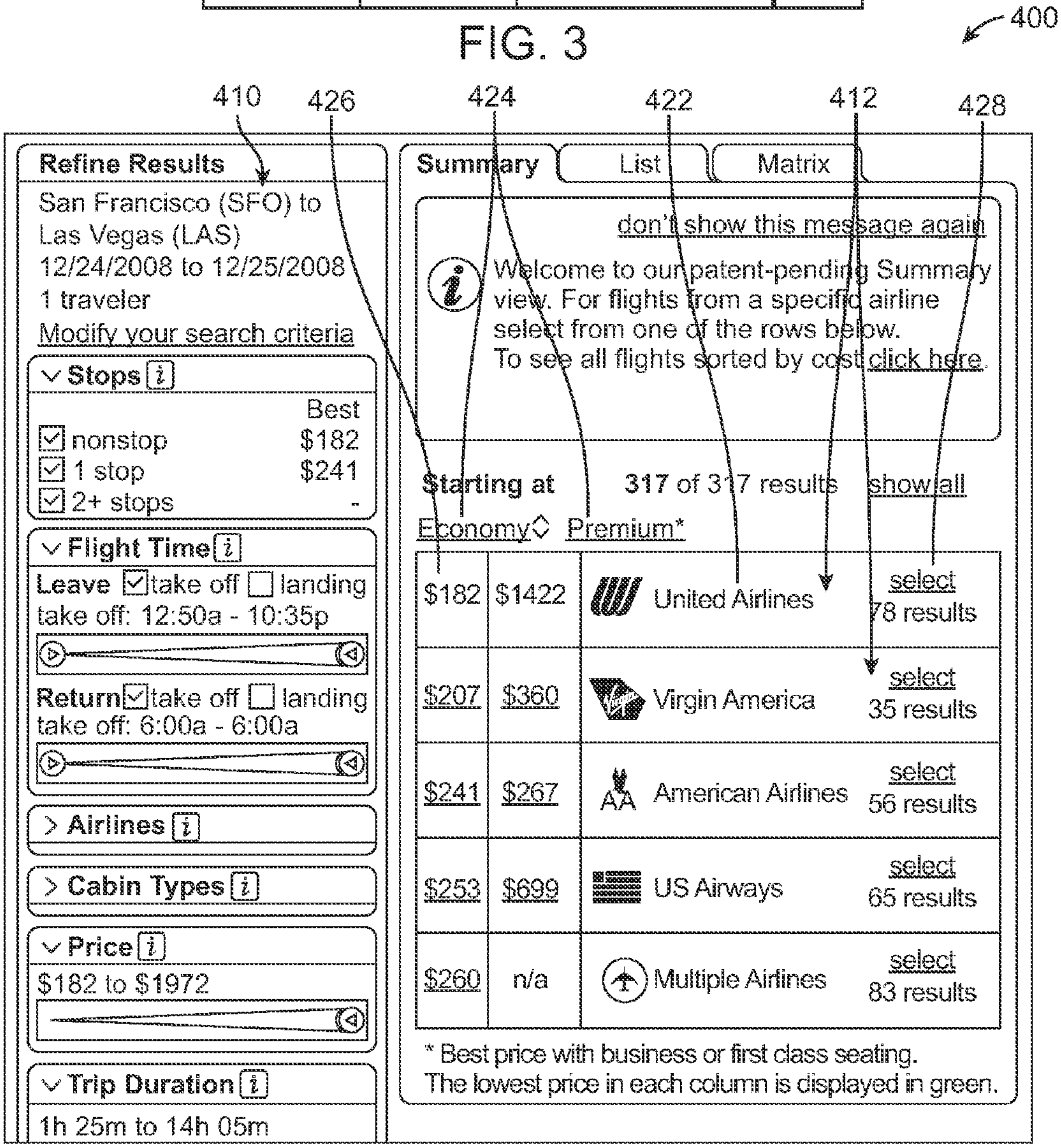
FIG. 4 illustrates a presentation that may be generated through use of a system such as described with an embodiment of FIG. 1, under an embodiment.

FIG. 4 illustrates a presentation that may be generated through use of a system such as described with an embodiment of FIG. 1, under an embodiment. In FIG. 4, presentation 400 may be generated as a web page or resource. A panel 410 may display and/or enable the user input parameters to be specified. In an embodiment depicted, the user is enabled to search for airfares. As input parameters, the user specifies (i) departure location, (ii) destination location, (iii) departure date, (iv) return location, (v) return date. Other desirability parameters may also be specified. In the context of airfares, desirability parameters include (i) whether the flights or non-stop, 1-stop or 2+stops, (ii) time or range of time during the day when travel (from departure to destination, or vice-versa) is to take place, (iii) product class (e.g. cabin type), and (iv) price range.

In an embodiment, the summary view 410 is returned to a portion of a web page that is displayed to the user (e.g. through the user's browser). For an implementation in which airline tickets are searched, providers may correspond to airlines. Each summary entry 412 may include an airline identifier 422. Still further, an embodiment depicted lists product classes 424 in form of cabin types (economy or premium), and pricing information 426 for each product class. The pricing information 426 as depicted may identify the lowest price available for the particular provider. However, pricing information 426 may alternatively reflect an average or overall price, the highest price, or the price of the product or service from the provider that is most likely to be selected. In addition to the pricing information, the summary entry 412 may display a count 428, corresponding to the number of products or services (e.g. airfares) of the service provider (airline) that match the user's input parameters (e.g. departure date, departure location, destination location etc.).

Each entry 412 may be selectable by the user to view listings that individually identify airline tickets or seats that matches the user's search parameter. The listings of the tickets may be aggregated from multiple sources or engines.

The summary entries 412 may be sorted or ranked in a table structure such as shown. In an embodiment, the entries are sorted by listing according to the lowest price offered by each provider.

Supplemental Information Variation

In an embodiment, the summary view may be enhanced with additional information that is useful to the user when selecting providers. In particular, embodiments provide for use of supplemental information that is specific to a provider, or to a class of products or services of the provider.

Figure 5:
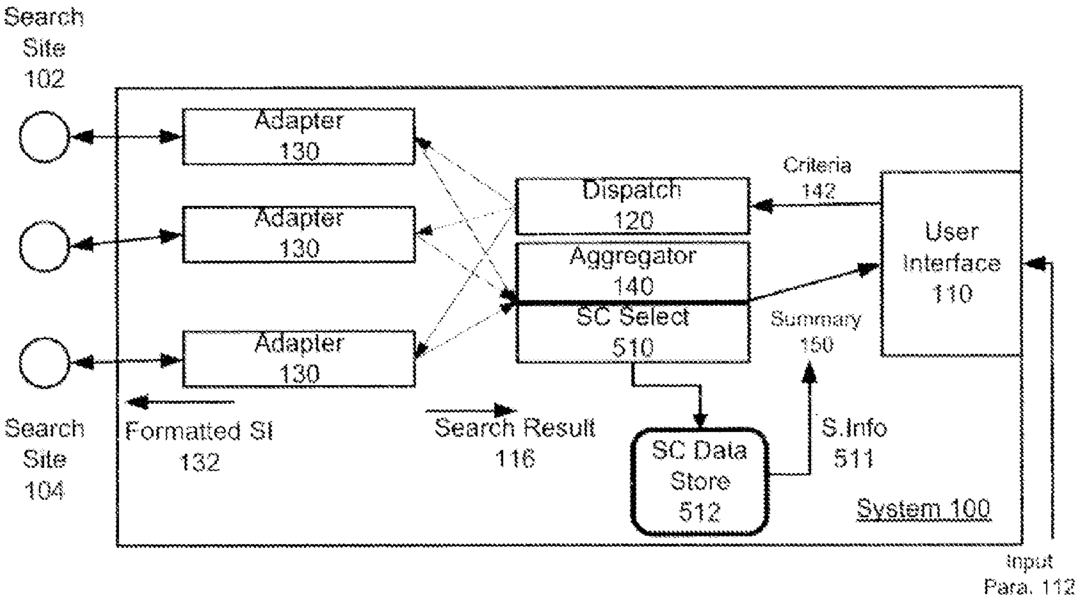
FIG. 5 illustrates a system such as described with FIG. 1, with additional functionality for enhancing the summary view of the search results with supplemental information about individual providers.

FIG. 5 illustrates a system such as described with FIG. 1, with additional functionality for enhancing the summary view of the search results with supplemental information about individual providers. Accordingly, system 100 may include many of the components described with prior embodiments, including user interface 110, dispatcher 120, adapters 130 to search engines 102, and aggregator 140. Additionally, the aggregator 140 may include functionality for counting listings that identify a particular provider, as well as sorting the entries that comprise the summary view. In an embodiment, the aggregator 140 includes a supplemental information component 510 that interfaces with an informational store 512 to access and present supplemental information for use with the summary view or its individual entries. In one embodiment, the supplemental information 511 may be displayed as a marker 614 (see FIG. 6A), and may include information that is specific to one of the providers that is presented in the summary view.

In one embodiment, the supplemental information component 510 implements rules or triggers that select (i) which of the providers represented in the summary view are to be shown in association with the supplemental information, and/or (ii) what supplemental information to use. A library of supplemental information may exist, with multiple pieces of information for individual providers. Thus, the selection of supplemental information may include consideration of what information to display, as well as for whom the information is to be displayed with. For example, one or more providers that are listed in a summary view presentation may be provided with a display element or marker that serves to promote that provider's entries and listings over those of other providers. Specific examples of such markings include visual markers that (i) identify one of the providers as being the highest rated (by users of the search site, or by third party site such as CONSUMER REPORTS); (ii) the provider(s) that offer incentives (e.g. sales, coupons, rebates) to customers; (iii) the provider(s) that offer additional value or provide the product/service with something not readily apparent, but likely of interest (meals on flights, Internet service for free etc.).

According to embodiments, the selection of what provider is to be marked (i.e. displayed with the marker 614) with supplemental information 511 may be based on a set of rules or algorithmic decision. The rules as to what provider is to be marked for supplemental information may include (i) monetization rules to the provider of the system 100, in that providers may be charged to have their summary entry shown with the marker (see 614 of FIG. 6) to supplemental information; (ii) rankings or ratings, where the provider of system 100 may seek to enhance the summary view by providing information that indicates high rankings or values (outside of the sort function); and/or (iii) the importance of information that is to be displayed. In the latter case, for example, some providers may offer information that is potentially critical for the user to see when making a selection of a provider. For example, some airlines may offer non-stop routes, while others do not.

When a summary entry is marked, the user is then able to view the supplemental information without having to navigate away from the summary view. For example, the information may be presented in a hidden window, or displayed to the user as an overlay.

FIG. 6A shows presentation 400, generated from a system such as described with FIG. 5, but modified to include the marker 614 for displaying supplemental information 616. In an embodiment shown, the marker 614 is displayed to draw the user's attention, so as to be indicative that there is interesting information for the viewer to see by selecting that provider over the other providers. In the example shown, the selection of the provider with the "Why Me" tag (as marker 614) results in the display of information that the airline/provider offers non-stop and meals (or WiFi Internet access, double air mileage for the route shown etc.). Numerous other variations are possible.

FIG. 6B shows another presentation such as provided with FIG. 6A, using other kinds of supplemental information.

Programmatic Implementation

Figure 7:
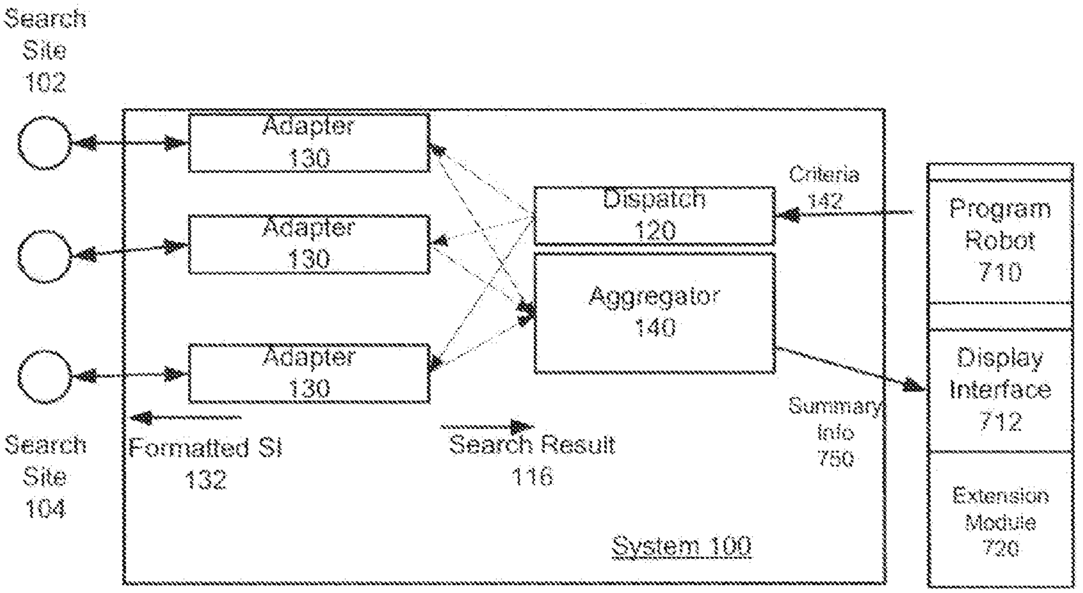
FIG. 7 illustrates a system such as described, enhanced to interface with one or more extension or external components for purpose of displaying summary information (such as produced with prior embodiments) in context with other content, according to an embodiment.

As an alternative or addition to embodiment such as depicted with FIG. 1 through FIG. 4, one or more embodiments provide for use of a program element (termed "robot") to trigger use and performance of the search system in a manner similar to that described with other embodiments, except that the robot generate the search criteria instead of a user. FIG. 7 illustrates a system such as described, enhanced to interface with one or more extension or external components for purpose of displaying summary information (such as produced with prior embodiments) in context with other content, under an embodiment. In FIG. 7, system 100 is modified to interface with a robot 710 and display interface 712, which may operate outside or independent of the search system. In one embodiment, the robot 710 and the display interface 712 are part of another module (extension module 720). For example, the extension module 720 may correspond to an advertiser interface that can programmatically interact with advertisements (in form of web content) in order to supplement the web content with search content.

According to an embodiment, robot 710 and/or other components of extension modules 720 interface with the system to initiates searches that are pertinent to other content or context. The robot-initiated searches may be pre-planned (e.g. performed as batch job in the evening), or performed in response to a specific event, such as the display of other content (e.g. advertisement) on a terminal. As depicted by an embodiment of FIG. 8A, the results of these programmatic searches may be displayed as search content to supplement the content that was the basis for the search. In an embodiment, the robot 710 scans web content (e.g. advertisement) for keywords or tags in order to generate search criteria for submission to a search system such as described with prior embodiments. An advertiser may, for example, populate web advertisement with tags or keywords that are identifiable to the robot 710. The robot 710 then generates the search criteria based at least in part on the tags or keywords of the content.

In an embodiment, the robot 710 does batch a series of pre-determined searches that are scheduled and performed in batch. The results of the searches are then selected for display on a given terminal for a period of time after the search was performed (e.g. in a subsequent day or 24 hour time period). For example, a given advertisement on the web may be associated with a geographic location (e.g. advertised hotel in New York City). The robot 710 may inspect the advertisement to identify a pertinent location, then perform a number of searches that uses criteria that includes the identified location. In the example provided, the robot 710 performs a series of searches for airline tickets to the pertinent destination. In order to provide meaningful search criteria, the robot 710 may assume different departure sites, such as flights to the identified location from the busiest ten airports or cities. Thus, the pre-planned search may be performed as a batch (e.g. submit ten searches to system 100 for the destination associated with the advertisement and using ten different departure sites). The returned search results may be formulated into search content. For example, in the case where the content was for an advertised hotel, the prepared search content may identify lowest airline tickets to the geographic location of the hotel listing, from ten different departure sites.

In an embodiment, the search results are performed prior to the display of web content that is to be supplemented. But information may be determined about the user or the user's terminal in order to select what search content is to be displayed to the user. For example, the geographic region of the user may be determined from his login registration or his IP address. In a batch search of the prior example, this information about the user may be used to select the best departure site to the destination of the user. Each search query may result in the return of summary information 750. The search information 750 may correspond to, for example, information that is parsed or identified from the summary view. For example, the information may identify (i) a provider and the count of products/services that match the search criteria 142; (ii) the count of the number of the product or service of a provider under a certain price; (iii) the count of the number of listings (by more than one provider) of the product or service that is under a specific price. The summary information 750 for that departure site is then selected and used to generate search content that supplements the web content. To extend the example provided, the user may live in Northern California, and this information may be determined from the user's IP address. One of the components of system 100 or extension module 720 may select the summary information 750 that incorporates 'San Francisco' or other Northern California departure sites. Thus, an embodiment may perform searches for use in providing the search content prior to using the search content, and optionally use information determined from the user to select what search content information (from previously performed searches) to display. In this way, the display interface 712 displays relatively recent search results that may optionally be tailored or configured for a particular user.

As an alternative, robot 710 generates the search criteria (or portions of the search criteria) in response to an event, such as the rendering of the advertisement or web content by the terminal. In one embodiment, robot 710 uses information determined from the user of the rendering terminal (or from the terminal itself) to determine additional search criteria that is communicated to the search system. In response to the event (e.g. display of advertisement, rendering of a page etc), the program robot 710 triggers or submits input to the system that corresponds to criteria 142. The system 100 uses criteria 142 to perform the search responsively to the content being rendered or displayed. The rendering or display may be in form of, for example, a broadcast (for multiple instances or terminals), or by download to individual terminals that access a web page. As further described by prior embodiments, the aggregator 140 may aggregate the listing of the search results 116. As part of (or alternative to) creating the summary view, the aggregator 140 may generate the summary information 750 from the criteria as determined. Thus, in one implementation the aggregator 140 generates the summary information 750 from or as part of the summary view. However, rather than display the summary information 750 as entries of the summary view, the summary information 750 may be communicated and integrated with the display interface 712. The display interface 712 may be graphically positioned to be in context or near content that triggered the robot 710. In this way, display interface 712 displays search content that represents live search results, optionally tailored for the user.

Figure 8A:
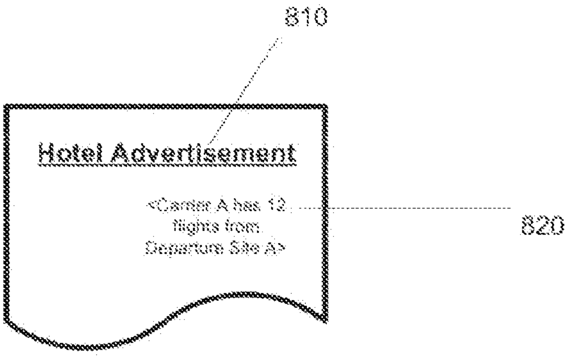
FIG. 8A illustrates an implementation of a system such as described with an embodiment of FIG. 7.

FIG. 8A illustrates an implementation of a system such as described with an embodiment of FIG. 7. In FIG. 8A, content 810 in form of web advertisement (e.g. banner ad) may display or promote an offer to a particular product or service (e.g. hotel accommodations). The content 810 of the web advertisement may be created for a website that is external to the search system of FIG. 7. The robot 710 (FIG. 7) may be implemented in form of a widget and/or script on the web page to scan the advertisement for keywords and/or tags. For example, the robot 710 may be implemented a program that includes a script to integrate logic into the web page in association with (i) the web content being made the subject of a campaign or otherwise identified to have supplemental search content, or (ii) the web page being rendered on a terminal. As described, the robot 710 may submit search criteria to system 100 upon scanning the content 810, so that resulting search content is available for use during a subsequent period of time (e.g. next day); or scan the content 810 upon the content being rendered or made available for display with one or more terminals (so as to provide live search results).

As an example, the web content 810 may correspond to an advertisement or promotional offer for a hotel accommodation. The advertisement 810 may run as part of a campaign with a web site or network. The extension module 720 (FIG. 7) may include robot 710 and serve as an interface between the advertisement campaign infrastructure and the search system 100 (see FIG. 7). The robot 710 scans the advertisement and determines from keywords or tags the location of the hotel. Optionally, the robot 710 determines other information, such as dates that the hotel offer is valid. When the content 810 is analyzed, the robot 710 submits the search criteria pertaining to the hotel. In the context of travel, this search criteria may be structured for air travel, and may identify the location of the hotel as the destination location. Optionally, the robot 710 may also include the date of the hotel offer as the date of travel for its search criteria. As previously mentioned, the robot may also assume other criteria, and perform a series of searches that are specific to each identified criteria (such as departure sites, the robot 710 may perform separate searches for each departure site). Still further, the robot 710 may use information determined from the terminal that renders the advertisement (or from the user) to either (i) select the search result that is displayed to the user, or (ii) further define the search criteria (for updating or creating a live search result). For example, robot 710 may determine a general geographic region from the user's terminal, and then either (i) incorporate a previously performed search result that is proximate to the determined geographic region, or (ii) use the geographic region of the user as part of the search criteria that identifies the departure site in a search for air tickets.

With regard to the examples and embodiments recited, criteria 142 (as generated by the robot 710) may identify the location of the hotel, and a specific date range. In response, the search system 100 identifies listings from which summary information 750 is determined. The summary information 750 may correspond to, for example, one or more of the following: (i) the total number of flights to the destination of the hotel that are under a certain price; (ii) the total number of flights to the destination of the hotel from an approximate destination of the user; or (iii) an average or lowest fare to the location of the hotel from one of the providers, using an approximate location of the user. In the example shown, the summary information 750 is displayed as search content 820. Other examples of search content may be used.

Figure 8B:
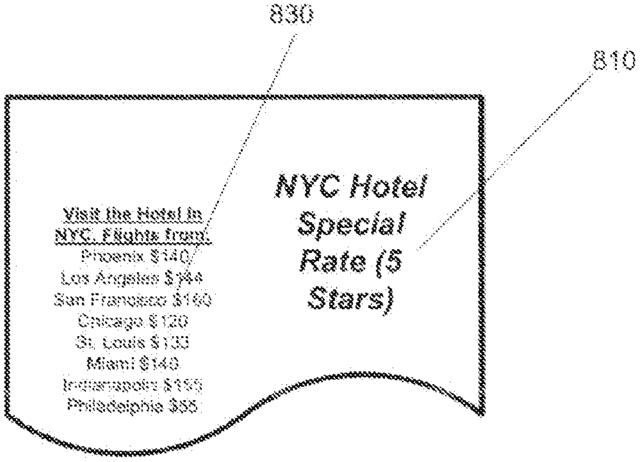
FIG. 8B illustrates another embodiment in which search content (displayed with web content) incorporates search information from multiple searches.

FIG. 8B illustrates another implementation in which search content 830 (displayed with web content 810) incorporates search information from multiple searches. Rather than identify user-specific criteria, or select pre-performed search results based on user-specific information, an embodiment such as shown with FIG. 8B provides for incorporating information determined from multiple pre-performed searches with search content 830 into a single presentation, on assumption that search information determined from at least one of the multiple searches will be pertinent or of most interest to a given user. In the example depicted, search content 830 displays cheapest fares from multiple departure sites to the destination identified from the content (e.g. location of the hotel having the special rate). The search content 830 may be pre-determined, by, for example, performing a batch search that specifies all of the departure sites and the destination site as search criteria 142. The search content 830 may then be displayed with the content 810 for all users (or users of a class), so as to provide recent information. An example as depicted can provide search content 830 that is pertinent or of interest to a user, without knowledge of user-specific information (such as the user's location).

With regard to examples provided, the search content 820 may be active, so as to be selectable to enable the user to navigate to a location where purchase for the listing of the search content can be made.

In an embodiment, the supplemental information component may be used to select the provider that is to have summary information 750 displayed with content 810.

Figure 8C:
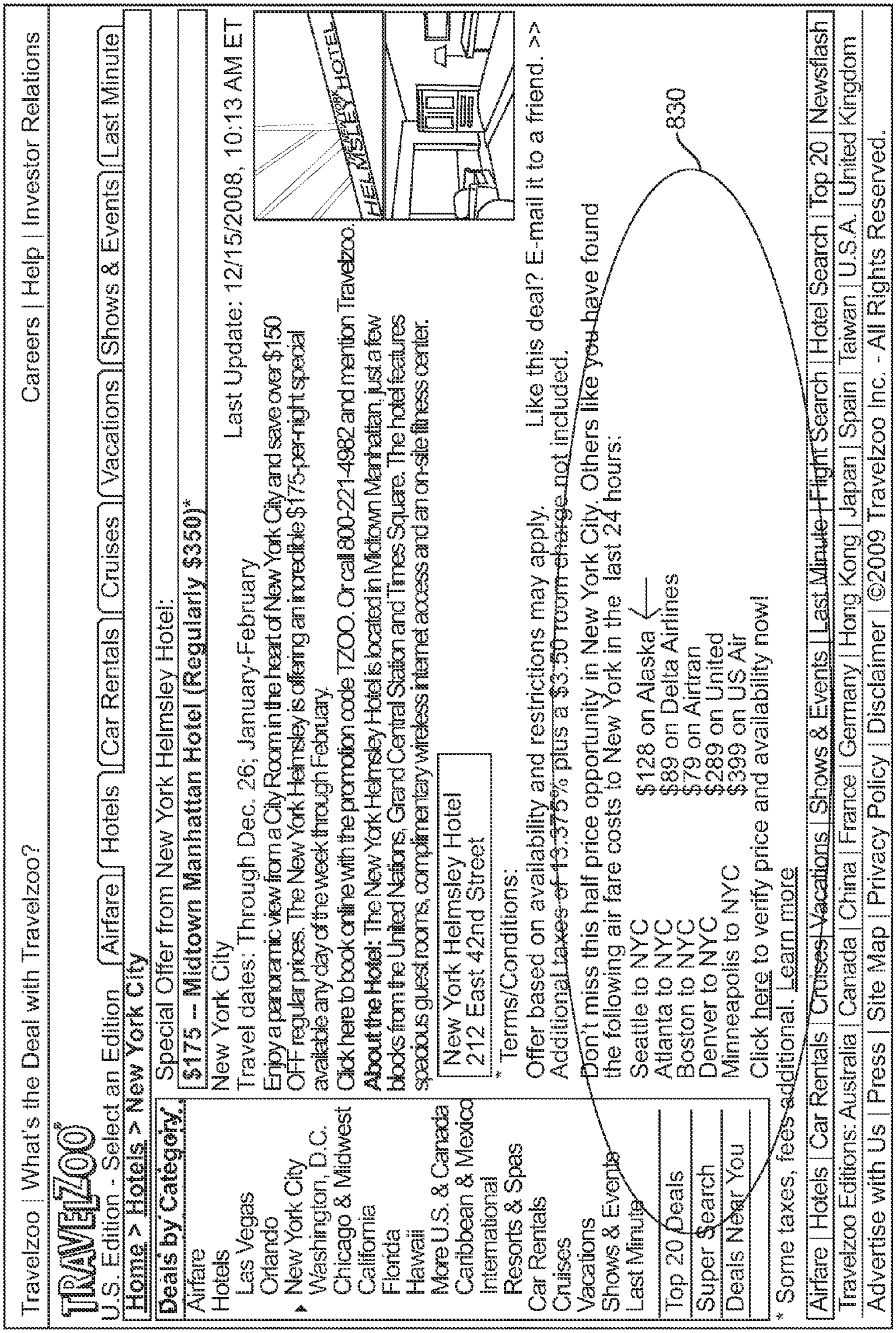
FIG. 8C illustrates another implementation that depicts web content (e.g. advertisement or promotional content) integrated with pertinent search content.

FIG. 8C illustrates another implementation that depicts web content (e.g. advertisement or promotional content) integrated with pertinent search content 830. The search content 830 may be derived in a manner described with, for example, an embodiment of FIG. 8B. However, the example of FIG. 8B depicts both airline and the departure site. The selected airline/fare may be the best (i.e. lowest price) found when the search was originally performed. Alternatively, the airline displayed may be selected for display in the context provided for other reasons, such as user or consumer ratings, or payments from the listed airline.

Community Discovery and Information Services

Figure 9A:
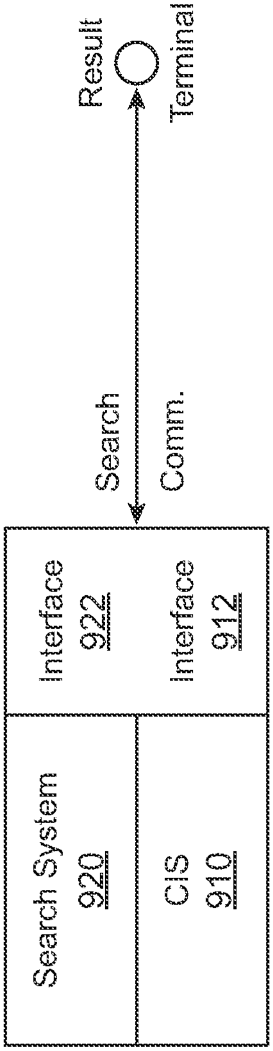
FIG. 9A illustrates a community information service (CIS) that is provided in connection with a search system.

Still further, some embodiments may be implemented in connection with a set of community discovery services that enable the exchange of communications between persons of a community, in connection with searches performed using a system such as described with any of the prior embodiments. FIG. 9A illustrates an embodiment in which a community information service (CIS) 910 is provided in connection with a search system 920 in order to enable persons that use the search system to exchange communications with one another, particularly when they are in the same community. Search system 920 may be implemented as described with any prior embodiments. The CIS 910 may enable communications in form of live blogging (or twittering) to others in the community of that user, chatting or directly communicating with other members of the community, or chatting or directly communicating with experts in the products or services being researched. In the case of products or services for travel, for example, the user may be enabled to chat (e.g. submit text or audio data) with other persons who are in the same community for purpose of comparing fares or travel deals. The user may also be enabled to chat with an expert, such as a travel agent.

In some embodiments, the community of a given user may be defined by geographic region. In one implementation, a user's community is determined as the geographic region of the person who uses the search system 920, or the geographic location that is of interest to the user (e.g. as a destination site). Still further, a user's community may be defined by class of persons who share a common interest (e.g. white water kayaking). A user's community may be determined in any one of many ways. In one implementation, the user's community is determined manually, through user input that interacts with the CIS 910. In another implementation, the user's community is determined programmatically, using information that is determined from the user's terminal, Internet connection (e.g. user's ISP information), or browsing/Internet activity. In one embodiment, the user's community may be determined by criteria and information the user provides in conducting searches using the search system 920. For example, a person may be identified as belonging to a particular community by, for example, monitoring (i) his or her departure or destination locations when that person is searching for airline tickets, (ii) the city or geographic location where the user is searching for hotel reservations, (iii) the city or geographic location where the person is searching for car rentals. To further extend the example, if the user shows interest in a location and/or topic through his use of search terms, the user may be associated with a community that is specific to that location/topic. For example, a user who submits searches for Hawaii may be associated with the community that corresponds to "Hawaiian vacationers" or "Vacationers".

In an embodiment, CIS 910 includes an interface 912 that is integrated with a search interface 922 of search system. Thus, for example, the user may access both services using a common web page or user interface. This allows the user to conduct searches and communicate with members of the community (or experts at the same time). In using the combined system, a user may enter search input 921 in order to receive search results, and submit or exchange communications (text message, audio, link etc.). In submitting the communication, the user may register or login to the CIS 910 using a moniker.

As an addition, the CIS 910 may include an archive or data store that is not live, but maintains history of messages and communications exchanged by community members. The archive may be provided as an additional tool of research for the user.

CIS 910 may host several forums or pages where ongoing live or asynchronous messages and communications are exchanged for communities. The forums/pages may further be defined by category (e.g. airfares, vacations etc.). Content filters may be used to maintain the pertinence of the forums or pages to the given geographic location of the community and selected topics.

As an addition or alternative, CIS 910 may also record and present information that consolidates or summarizes results of searches performed by other members of the same community. In one embodiment, the CIS 910 monitors input into search system 920, returned search results, and/or subsequent user interactions in order to record information of interest to others in the same community. In the context of air travel, for example, such information of interest may include, for example, (i) the best fare a person in a community found in a particular day to a popular destination or region for that community (e.g. best fare from New York City to Miami for New York community); (ii) average of fares individuals in the community received or booked for a given time period; (iii) the best fare (as determined from a search performed by another member of the community) to a geographic region that is outside of the community; (iv) special prices or deals that have been found by others in the community.

In one variation, the user's geographic or community interests may be used to provide the user with programmatically triggered search results. For example, search system 920 may observe the user performing numerous searches for Hawaii during one session. In a following session, the user may visit the site and perform a search for another location (e.g. 'Seattle). Separate from the Seattle search, pertinent search content related to the user's past search activity may be displayed to the user. For example, a separate panel may be displayed to the user showing Hawaiian search results that are current for that date, based on the user's interest in his previous session. As a variation, the user may be shown search content that includes summary information (optionally with his Seattle search) for a live or pre-performed search for air travel to Hawaii.

Figure 9B:
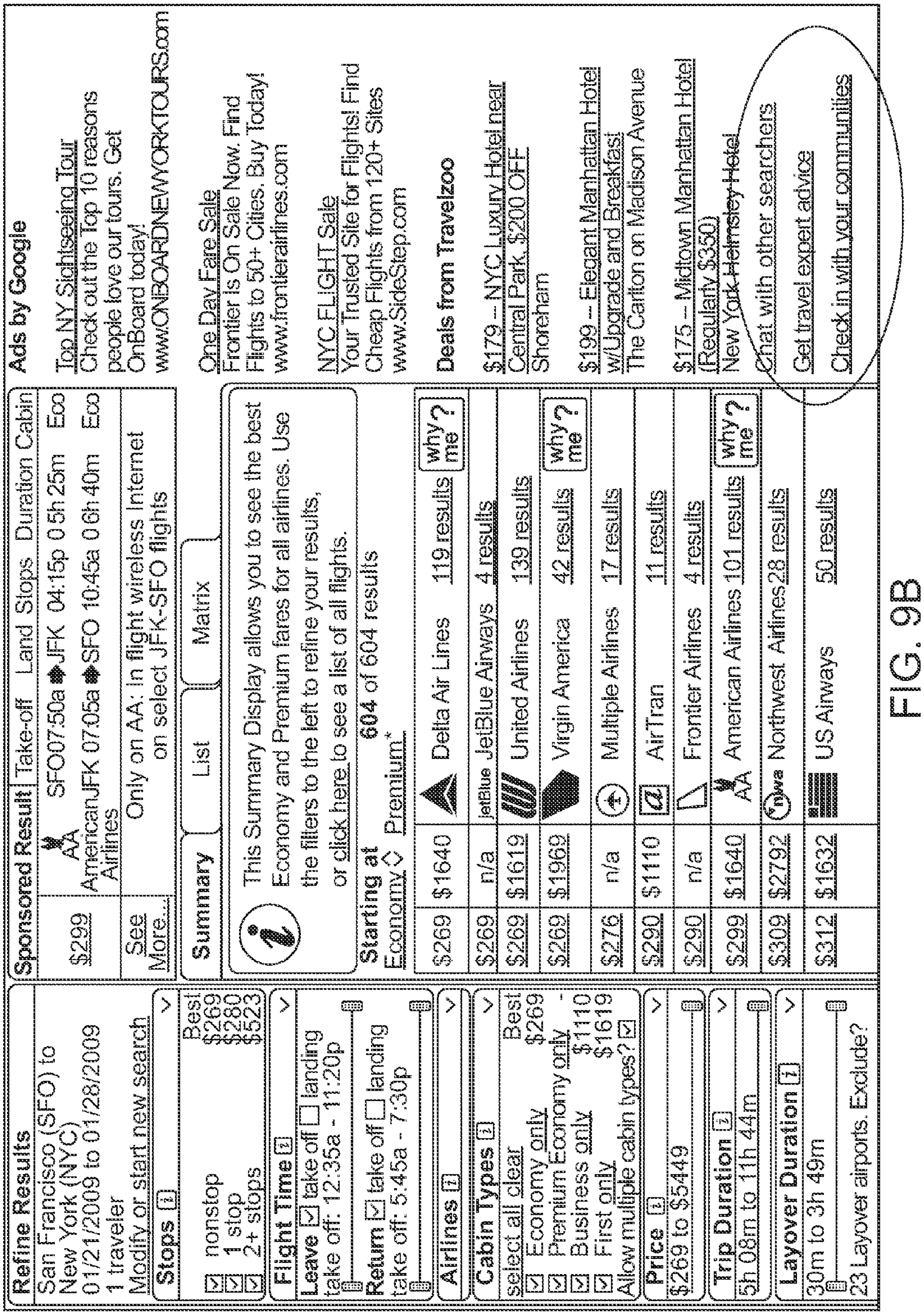
FIG. 9B illustrates a presentation for a user that enables the user to access community information and discovery services through an interface that enables the user to interact with the search system.

FIG. 9B illustrates a presentation for a user that enables the user to access CIS 910 through an interface that enables the user to interact with the search system 920. A common presentation (e.g. web page; see FIG. 9B) may enable the user to move from search results (as shown with the summary view) to CIS features, such as features to enable the user to chat with an expert (e.g. travel agent), chat with searchers (e.g. other persons using the search system 920 at that moment), view messages or communicate with others of the user's communities (e.g. geographic or topical communities). The user may select a link from the summary view (as provided on presentation) to access one of the CIS features.

Pricing Information for Travel Products Presented with Calendar

In some embodiments, a service provides pricing information for travel products (e.g. airfare, hotel lodging etc.) using a calendar view or presentation. Travel products generally require specific calendar dates in order to determine pricing and availability. Typically, pricing for travel products changes depending on the selected dates in which travel is to occur. For example, airfares are generally cheaper when departure occurs in the middle of the week. Likewise, hotel lodgings are often most expensive on Saturday nights. There are also special days, such as holidays or days that coincide with the occurrence of a special event in a particular location, which impact the availability and pricing of travel products. Accordingly, embodiments described herein utilize a calendar view presentation to inform users of pricing information for a given travel product over a range of multiple dates, under the premise that many users appreciate instantaneous information about pricing of a travel product of interest on alternative dates to that which is of initial interest. For a given travel product, the calendar view may be provided in connection with a search from multiple sources for purchase or reservation. For example, with airfare, multiple booking engines (or other online resources) may be queries, and results from the different engines are aggregated and sorted by price and/or other criteria, in order to provide the calendar view with pricing information that indicates, for example, the lowest price of any fare for individual when multiple sources for purchasing fares are checked. In this way, multiple providers (e.g. airlines, hotels) may be aggregated to determine travel products that satisfy travel criteria.

Figure 10:
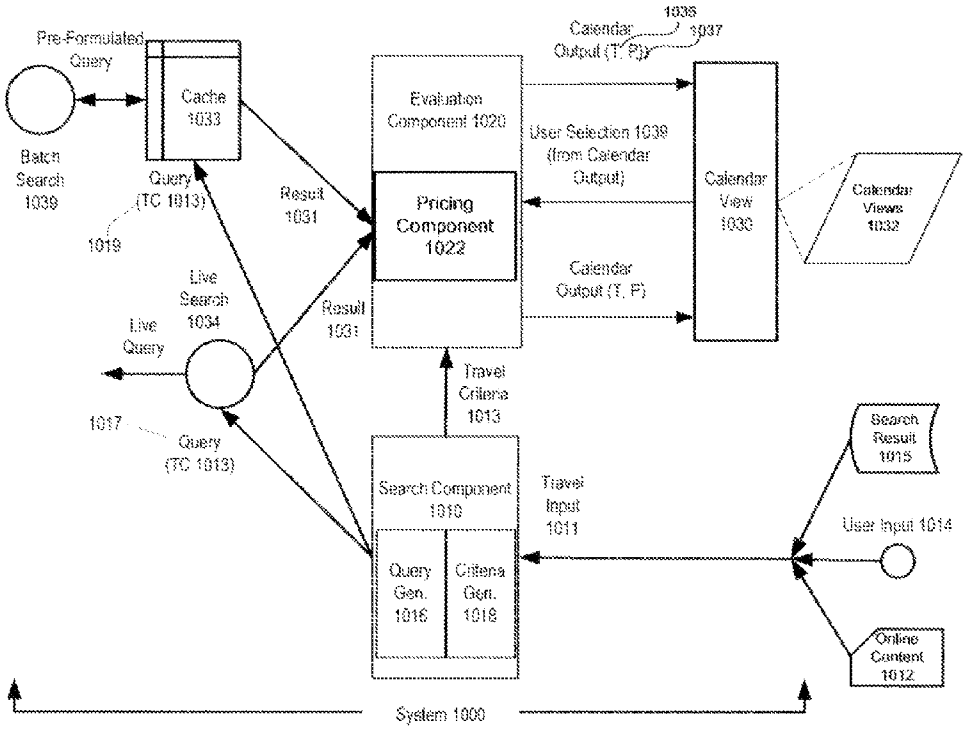
FIG. 10 illustrates a system for presenting search results for travel products in a calendar view, according to one or more embodiments.
Figure 11A:
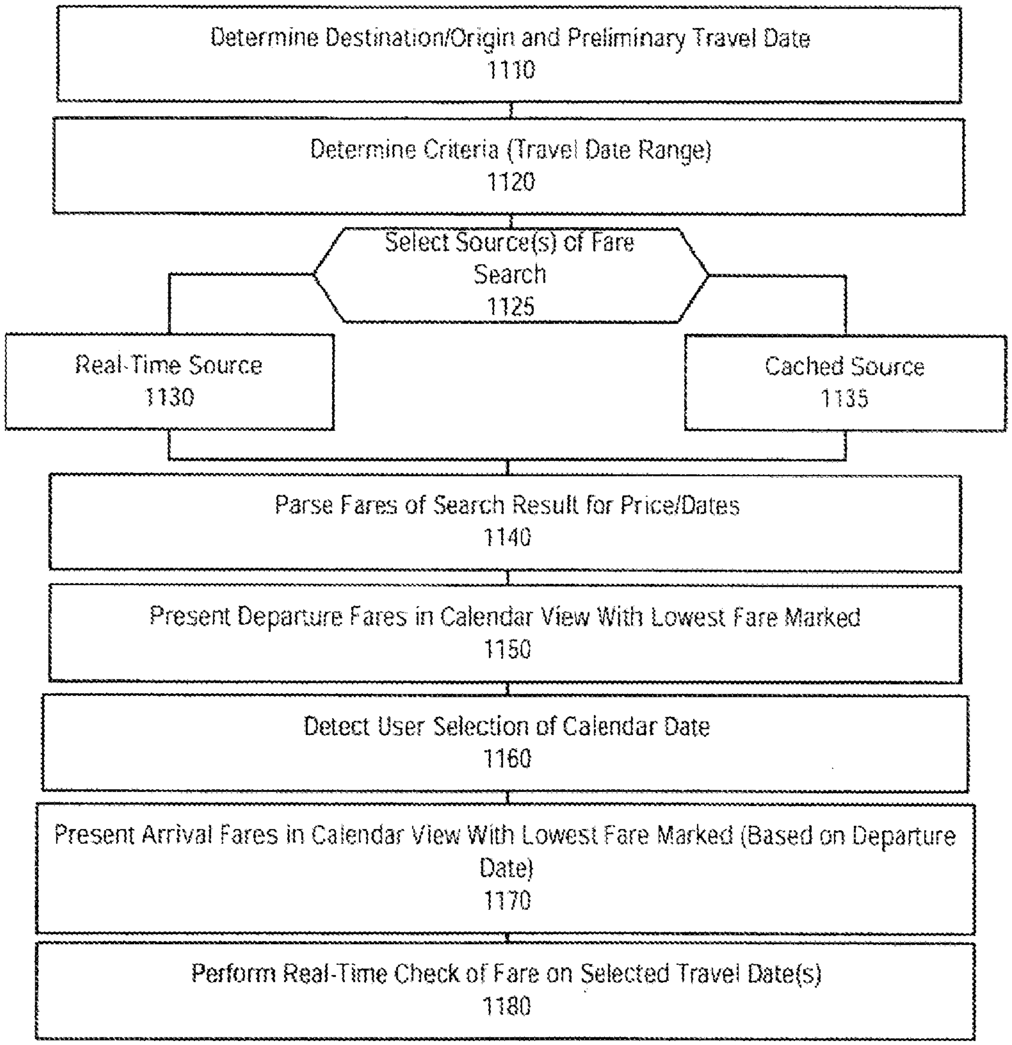
FIG. 11A illustrates a method for presenting pricing information of travel products with days or units of a calendar view, according to one or more embodiments.

With reference to FIG. 10, a system is depicted for presenting search results for travel products in a calendar view, according to one or more embodiments. A system 1000 such is depicted by FIG. 11A can be used to enable a user to research and purchase (or reserve) travel products, such as airfare or hotel lodging. Alternative travel products such as car rentals, cruises, train fares or travel packages may also be researched and purchased (or reserved) through system 1000.

The system 1000 includes a search component 1010, an evaluation component 1020, and a calendar presentation component 1030. The components combined to aggregate and present search results. In one embodiment, search results (i) are collected from multiple sources (e.g. online booking engines), and (ii) comprise of fares or other travel products that are provided by different entities (e.g. multiple airlines can provide airfares for common route). Thus, according to some embodiments, the search component 1010 is a metasearch engine, in that it queries or otherwise accesses multiple engines concurrently. The travel products may also be searched to identify pricing information for different kinds of products, such as different classes of airfares or lodging. The search results can specify travel products of a specific type (e.g. airfares), using one or more sources that provide pricing and availability information about a particular travel product. In some embodiments, the sources for the travel products correspond to online services that maintain such information about specific types of travel products. In an embodiment, system 1000 is capable of performing either live, on-the-fly searches using databases of such online services, or system 1000 may perform searches using cached data from predetermined or prior searches.

According to an embodiment, the search component 1010 receives travel input 1011 from one of multiple possible sources, such as from online content 1012, user input 1014, or an alternative search result or medium 1015 (such as provided by the summary view of FIG. 1). The search component 1010 includes a query generator 1016 and the criteria generator 1018. The criteria generator 1018 includes logic to formulate or identify multiple criteria (travel criteria 1013) from travel input 1011, particularly multiple criteria for a desired or specified travel date. In this way, the criteria generator 1018 can use travel input 1011 to identify a range of dates that comprise travel criteria 1013. For airfares, the travel criteria 1013 may identify (i) a destination, (ii) an origin or point of departure, and (iii) one or more travel dates. The travel dates can correspond to a date of departure and/or a date of arrival. As described below, criteria corresponding to the travel dates may identify a range of possible days, based on a preliminary date of interest or indication, specified by the travel input 1011 or otherwise. Thus, for example, in the case of a user who specifies a departure date on the $15^{th}$ of a given month, the travel criteria 1013 may include a departure date that identifies a range of dates before and/or after the $15^{th}$. For hotel lodgings, the travel criteria 1013 may identify (i) a destination for the lodging, (ii) an arrival date, and (iii) a departure date. Similar travel criteria can be determined for alternative travel products, such as car rentals.

As further described below, for airfare, travel criteria 1013 may also specify a date range for a return leg of a round-trip journey. The date range for the return leg may, in some embodiments, be determined from individual dates in the date range of the departure leg. For example, a user may specify a preliminary departure date for to research airfare, from which a range of departure dates is determined and included as part of the travel criteria 1013. For each date in the departure date range of the travel criteria 1013, one or more arrival dates can be identified. The combination of departure and return dates may form or be represented as a roundtrip fare matrix, including i rows (e.g. for departure date) and j columns (e.g. for return date). As described, the various calendar views can display various information determined from a roundtrip fare matrix. Moreover, some embodiments can increase the size of the roundtrip fare matrix so that the calendar view is extended, by for example, more than one month.

According to some embodiments, query generator 1016 uses the criteria 1013 to generate one or more queries to one or more sources for obtaining approximate or real-time information about pricing and availability of the travel product that satisfies the criteria 1013. In an embodiment, the query generator 1016 makes a determination as to whether to generate a live search query 1017 or a cached search query 1019. Under one implementation, the cached search query 1019 is enabled for certain popular criteria in order to optimize performance of system 1000. According to an embodiment, the cached search query 1019 corresponds to a batch of search queries 1039 that are executed prior to the user entering his or search criteria. For example, the batch of search queries 1039 may be executed in parallel, hours or the evening before, when network traffic is reduced. The batched search queries 1039 may be executed as pre-formulated queries for popular travel products. In the case of airfares, for example, system 1000 may identify an X number of most popular routes for airfares, between a set of destination and departure cities. For a given calendar period, such as 90 days from the present day, system 1000 can execute a batch query process in which fares for the X number of popular routes is determined on a continuous (e.g. daily basis) using online search databases. For each such route, a roundtrip fare matrix is this generated and cached, which holds, for example, the roundtrip pricing information for each departure date in a range of departure dates (e.g. 90 days), and the arrival date for the return leg of each roundtrip fare. When one of the popular routes is searched by giving user, query generator 1016 is able to identify from the criteria 1013 that the fare pricing and availability information is predetermined and cached. The query generator 1016 then uses the criteria 1013 (including the expanded date range) to search the cached store 1033 (e.g. holding fare information from a prior night batch search). On the other hand, if the travel criteria 1013 does not specify one of the popular routes, the query generator 1018 interfaces with one or more live, online search databases (e.g. live source 1034) or services to generate on-the-fly information about pricing and availability of the travel products that satisfy the search criteria. The live search 1017 may also return a matrix result, but the live search may be reduced in potential date ranges in order to return the result in an acceptable time period. Processes for returning and presenting a matrix result under either a cached or live process is illustrated with, for example, an embodiment of FIG. 13A.

According to some embodiments, the search component 1010, as well as the use live or cached queries 1017, 1019, can be implemented using a search system such as described with an embodiment of FIG. 1. Thus, for example, system 1000 may incorporate or use a meta-search engine, and adapters for programmatically querying and interfacing with other online search and booking engines.

The evaluation component 1020 retrieves or obtains results 1031 from either the cash source 1033, or the live source 1034. In one embodiment, the evaluation component 1020 includes logic to a pricing component 1022. The pricing component 1022 identifies, from results 1031, particular products that satisfy a pricing criteria for a particular date in the date ranges of the travel criteria 1013. The pricing criteria may correspond to, for example, the least costly travel product provided for the particular travel date. In the case of airfare, for example, the results 1031 can include fares from multiple airlines, and the pricing component 1022 processes the results 1031 to identify the lowest priced fare for each day, amongst the fares from multiple airlines.

For example, in the case of airfare, the pricing criteria may identify the cheapest flight that satisfies the particular travel criteria 1013, for each day in the range of the departure dates. Variations provide for the pricing criteria to be specific to a particular product class (e.g. nonstop flight, five-star hotel). With airfare in particular, one or more embodiments determine flights that satisfy the pricing criteria based on the matrix of departure and return dates, so that each departure date in the range of departure dates has several possible return dates. In the case where pricing information represents the lowest price, for example, the lowest price airfare available on each departure date is identified, as well as the lowest price airfare for each date of return in the range of return dates associated with each departure date (e.g. each departure date may have five possible return dates). Thus, pricing information is determined for a range of possible departure dates, as well as for a range of possible return dates, where the range of return dates is comprised of sub-sets (date ranges) that each coincide with one of the departure dates in the range of departure dates.

The evaluation component 1020 also use other criteria in connection with the pricing criteria, such as product class or provider of the travel product. For example in the case of lodging, the pricing component 1022 identifies from, for example, travel criteria 1013 that the lodging is to be four-stars or better, in which case the pricing component 1022 identifies the cheapest four-star lodging for individual travel dates, even though cheaper rates are available for three-star hotels.

In either case, the evaluation component 1020 identifies travel products that satisfy the travel criteria and pricing criteria, in order to associate pricing information 1035 (that satisfies the pricing criteria, e.g. cheapest, or cheapest by class) with travel dates (from the travel criteria) 1037. The pricing information 1035 and travel dates 1037 are output to the calendar presentation component 1030. The calendar presentation component 1030 uses the pricing information 1035 to populate a calendar view 1032, so that individual units of the calendar view (e.g. day of the week) are populated with pricing information of products that match the travel criteria for a range of travel dates. The calendar view 1032 may be presented as, for example, a monthly or weekly day view. The individual days (or other calendar unit or interval) are presented with one or more prices of travel products that satisfy both the travel criteria 1013 and a pricing criteria (e.g. cheapest of the day).

According to some embodiments, the calendar presentation component 1030 generates one or more calendar views 1032 to be interactive. In an embodiment, the calendar view(s) 1032 present links in association with rendering the pricing information 1035 in association with specified dates 1037. Under some implementations, the user can select any of the displayed links to directly interface with the provider that is supplying the travel product displayed with the pricing information on that particular day or calendar unit.

In the case of airfares (or other fares), a sequence of calendar views 1032 may be generated. The evaluation component 1020 outputs pricing information 1035 for individual departure dates in a range that satisfy the travel criteria 1013. A first calendar 1030 in the sequence shows a range of departure dates and pricing information (cheapest fare for that day) for airfares. The user may interact with the first calendar 1030 by making, for example, a selection 1039 of a calendar day (after viewing the pricing information for a range of days). In response to today's selection, evaluation component 1020 may output pricing information 1035 for a range of return dates that are determined from the departure date of selection 1039. An embodiment of FIG. 13B illustrates methodology that includes presenting a return (or arrival) calendar that displays return date pricing information based on the selected departure date. The calendar presentation component 1030 may then generate a second calendar view 1032 to show pricing information 1035 for the return leg of a trip.

FIG. 11A illustrates a method for presenting pricing information of travel products with days or units of a calendar view, according to one or more embodiments. In describing a method of FIG. 11A, reference is made to elements of FIG. 10 in order to describe or mention a suitable element for performing a step or sub-step being described. An embodiment of FIG. 11A is described specifically for airfares as travel products, although variations and alternatives include other travel products, such as lodging, rental cars, or other forms of fares (e.g. cruises).

For a given context or application, initial travel input is determined, including the destination, an origin or point of departure, and a preliminary travel date (step 1110). In one embodiment, the travel input is determined from user input. For example, system 1000 may be provided as a self-sustaining service, such as provided on the website, for enabling visitors to research airfares.

As another variation, system 1000 may use as input, search results formulated under a different environment or user interaction. For example, a search engine such as described with prior embodiments may output a search result using criteria that identifies a departure date, a destination, a point of departure, and a return date. As still another variation, the calendar may be linked or presented with a summary view presentation of search results (see FIG. 16B).

Still further, as another alternative or addition, the travel input is determined from other sources, such as online content. For example, a programmatic component may scan or parse web content (e.g. online advertisement, such as shown with FIG. 16D) in order to determine a location associated with the online content. This location is used as, for example, the destination for the travel input. Travel date information may be determined from the online content as well. For example, in the case of online advertisement, the content generally identifies dates (or ranges of dates) in which a travel deal is valid. These dates can be parsed from the content, and one or more dates from the content can be selected for the travel input. Still further, a point of departure for the travel input may be determined from various sources or assumptions: most popular routes to the identified destination, geographic information that may be assumed or known about a particular user who is to view the calendar output, etc.

As an alternative to scanning the content for criteria, an embodiment provides that the location of the online content is entered into a query contemporaneously with the online content. Deliverance of the content in an online medium may trigger use of the structured query to display the pricing and/or calendar information about various routes that encompass the destination of the online content and its dates.

In some embodiments, travel criteria is determined from the travel inputs (step 1120). In some embodiments, the travel criteria expands the range of dates provided with the travel inputs. For example, a specified departure date may be expanded to include each of several preceding and following days to the specific date specified for the travel input (3 days before, 3 days after, seven days total). The return date is be expanded or determined to encompass a range of days, based at least in part on the range of departure dates. For example, some embodiments may determine the range of return dates under an assumption that most trips range between one and ten days. The range of departure dates would then correspond to (i) the first day after the first departure date in the range of departure dates, and (ii) the 10th day after the last departure date in the range of possible departure dates. In the example provided where the range of departure dates is 7 days, and the range of return dates is 10 days, a 7 by 10 matrix may be used to implement the calendar view. Additional examples for generating a matrix of results for departure/arrival dates is described with an embodiment of FIG. 13A.

In addition to expanding the date range, other criteria may be determined, such as preference for a product class (e.g. business class), provider (specific airline), product characteristic (non-stop), etc.

According to an embodiment, one or more sources are determined for performing the search for airfare using the identified travel criteria (1125). As mentioned with system 1000, a cache resource 1033 can be used in some instances or applications (1130). In such cases, one or more embodiments provide that an additional step of verification of pricing information and/or availability is determined once the user makes the selection of a particular departure date or product. Alternatively, a real-time source may be determined for the travel criteria (1135). Aspects of the travel criteria may affect the selection of the source. For example, if the travel criteria specifies certain regional routes, system 1000 selects only services that offer the particular route.

Once search results are procured and fares determined, the individual fares are evaluated for pricing information, as well as dates in which such pricing information is available (1140). Fares are identified based on satisfaction of a pricing criteria, such as the lowest fare available on a particular day, or the lowest fare available on a particular day that satisfies other criteria such as product class.

For departure flights, the pricing information for one or more fares that satisfy that pricing criteria is identified and presented for each date of departure in the range of departure dates (1150). In one implementation, the lowest priced fare for each date and a range of departure dates is presented on corresponding days of the calendar view.

According to one embodiment, user selection of pricing information (or of a calendar day, or other input that corresponds to user interaction with the calendar view 1032 is detected (1160). The interaction may navigate the user to a location where the airfare may be purchased or reserved. In cases where a return leg is desired, the user selection of a particular calendar day (or corresponding pricing information) from a first calendar view results in generation or presentation of another calendar view 1032 (1170) (see FIG. 12B). The follow on calendar view 1032 shows pricing information (which may satisfy some pricing criteria) for possible return dates, given the particular date of departure selected by the user just prior. Thus, for example, a sequence of calendar views may be available to the user representing departure and return flights of a desired trip. The departure calendar view 1030 displays pricing information for a range of possible departure dates, determined from a preliminary indication of departure dates (e.g. user input, identified from content etc.). Once the user indicates from the first calendar view a desired departure date, a second calendar view is presented (or populated to the user that shows pricing information for a range of return dates that are determined from the indicated departure date (see FIG. 12B). For each date in the range of departure dates, pricing information that satisfies some pricing criteria are threshold, is displayed.

In one embodiment, the user's selection of travel dates results in the system 1000 performing a real-time check or search (1180) of either (i) fares that match travel criteria that includes the travel date(s) of the user's selection, or (ii) the lowest price fare of the selected day. The real-time check recognizes that pricing information for travel products is fluid, and changes by minute or by hour.

Figure 11B:
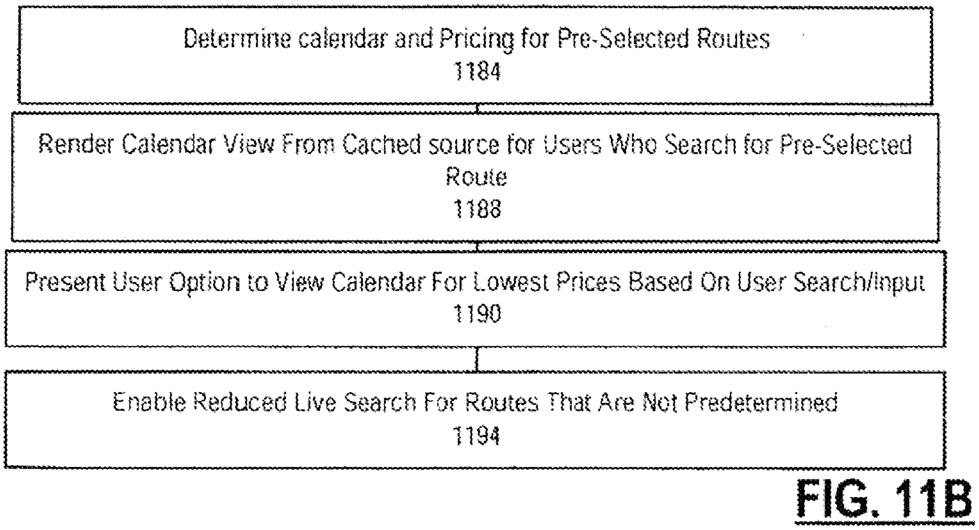
FIG. 11B illustrates a refinement to providing pricing information in a calendar view, according to an embodiment.

FIG. 11B illustrates a refinement to providing pricing information in a calendar view, according to an embodiment. Initially, a set of pre-selected (e.g. most popular routes) are queried to one or more online databases that maintain availability and pricing information for flights (1184). With reference to an embodiment of FIG. 10, such data is stored as, for example, cached source 1033. The preselected queries may be performed on, for example, a daily basis, in batch. For each route, an m×n matrix may be built representing m possible departure dates, and n return dates for each departure date (see also FIG. 13A). For example, for San Francisco to Chicago routes, the departure leg may be calculated for 90 (m) days out, and the return leg may be calculated for 14 (n) days, to create a 90×14 matrix for the particular route. As mentioned, the matrix may be updated routinely, such as on a daily basis. The select number of routes may correspond to, for example, the 400 most frequent or popular routes.

Any one of many user interfaces are applications may be used to initiate and deliver a calendar view to a user. For example, system 1000 (FIG. 10) may be provided in connection with a booking engine that searches for airfares and travel products for multiple carries and/or from multiple sites. In one embodiment, individual user interactions are programmatically monitored to determine users who input information to view one of the predetermined routes. Results of a user's search may be presented to the user. In many cases, the user may select to view the results from his airfare search in a calendar view, in which case the calendar view is rendered for that user on request (1188).

In other cases, however, the user may be guided or prompted to investigate alternative dates than one he has initially specified. In such cases, the user may be provided a calendar that displays pricing information for a range of dates other than the one he expressly identified, with separate markings or text indicating the lowest fare the calendar period has to offer. Accordingly, in other cases, the user may search for a route without selecting the calendar view. The system 1000 may generate indicators and/or text that convey information to the user that he or she can save money if the user is willing to adjust a travel date (1190). An example of such a message or prompt is shown with FIG. 16A and FIG. 16B ("Calendar best price $207). To facilitate the user's selection of a travel date, the calendar view is presented to the user.

As mentioned, for routes that match one of the batched queries, the calendar view is at least initially presented using information from the updated predetermined matrix (1188). According to one embodiment, the system 1000 either (i) prompts the user to see the calendar view, or (ii) automatically presents the calendar, in response to determining that the user is researching airfares for one of the predetermined or cached routes. Alternatively, the prompt or delivery of the calendar view may be provided in response to determining that the user would save money if one or both of his departure/arrival dates are altered. As mentioned, this determination can be made using the matrix of predetermined routes.

When the user makes a selection of fares or travel dates using the calendar view, system 1000 may initially seek to use the cached resource 1033 (pre-determined batch queries) for pricing information to populate the calendars. As mentioned, the cached resource 1033 may be fairly up-to-date, but not real-time (e.g. batch queries may be executed hours earlier). As pricing information for travel products is often fluid, some embodiments include an additional step of verifying pricing information that is preliminarily selected by the user, in order to ensure the pricing information has not changed. Such verification may be performed by a live search that verifies the pricing information displayed with the date, or alternatively, that the date selected has the lowest priced fares (1194).

For routes that do not match one of the batched queries, pricing information for populating a calendar view for the selected route may be determined using a live search. In performing the live search, a smaller matrix of departure dates by return dates may be used, as compared to the batched queries. For example, 7 day ranges may be used for departure days (3 days in front of preliminary date provided by user and 3 days after), and 10 day ranges for return dates (for each departure date). The queries for the live search may be run in parallel, to return results in a suitable time frame for an online environment.

Figure 12A:
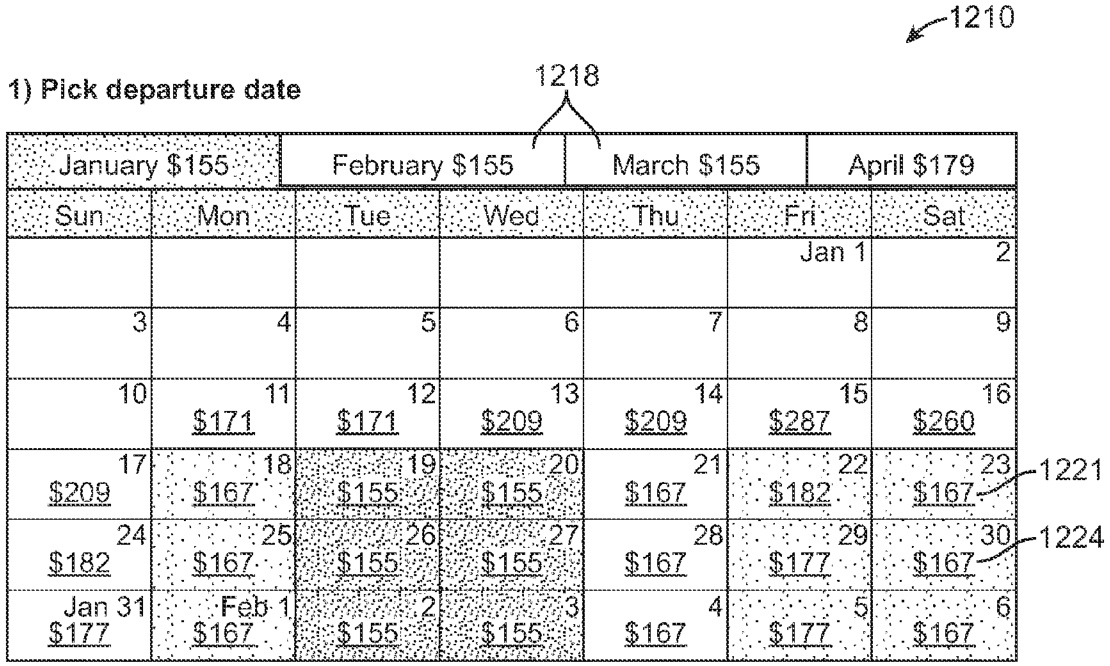
FIG. 12A illustrates a calendar view for displaying pricing information for a given set of dates, according to one or more embodiments.
Figure 12B:
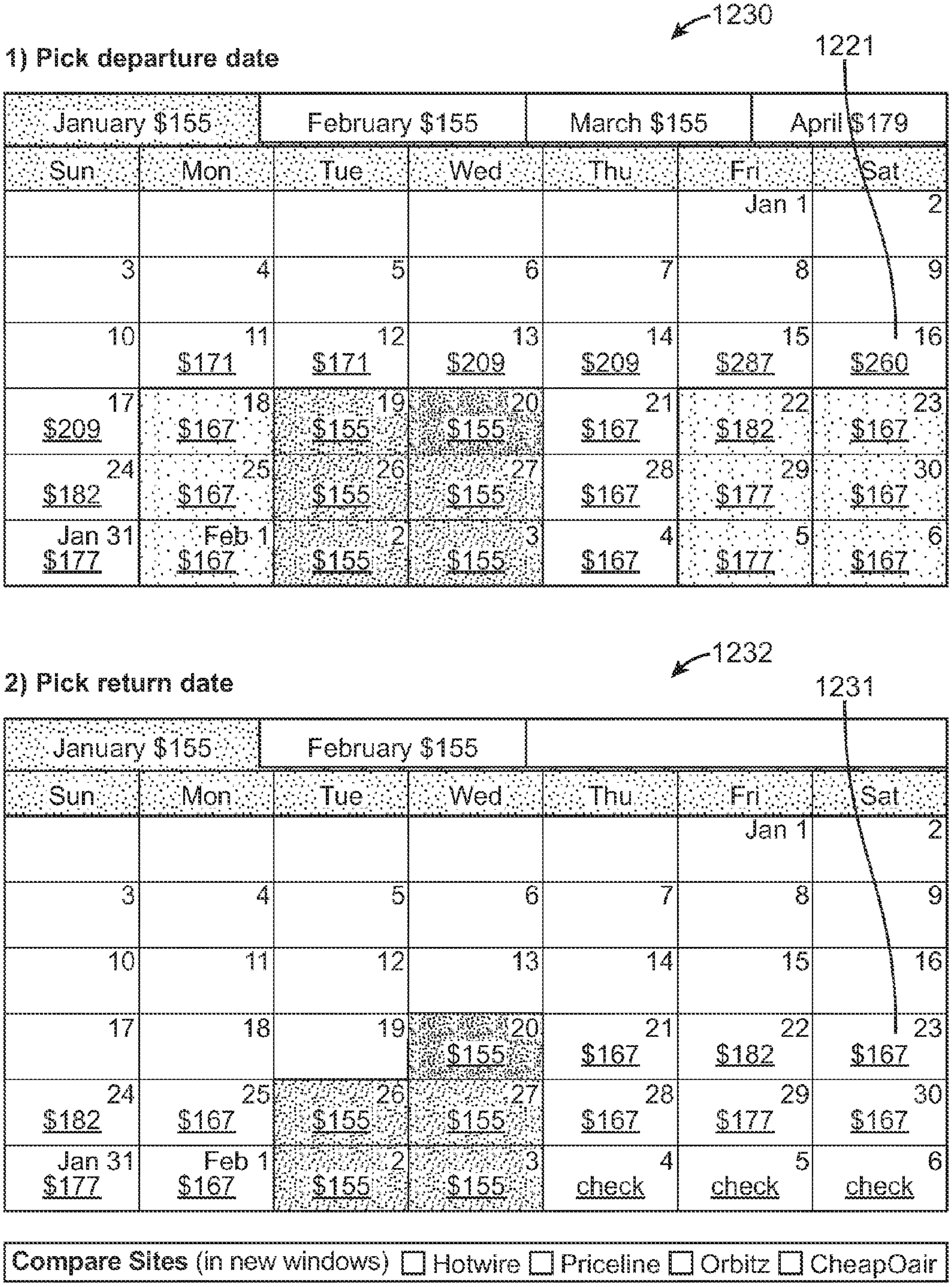
FIG. 12B illustrates a variation in which a sequence of calendar views (for departure and return legs) containing pricing information is displayed for a particular route, according to an embodiment.

FIG. 12A and FIG. 12B illustrate examples of calendar views, according to one or more embodiments. FIG. 12A and FIG. 12B each illustrates a calendar view 1210 for displaying pricing information and links to travel products on individual dates. An embodiment of FIG. 12A and FIG. 12B is specific to airfare, although similar views may be generated for other travel products, such as lodgings and car rentals. In FIG. 12A and FIG. 12B, the calendar view 1210 is generated for travel input that can be identified from, for example, user input, online content or search result. In the examples shown, the calendar views 1210 have a monthly format and display days as calendar units. Other calendar views may alternatively be used, such as those that display a weekly format, a range of days, or portions of days.

With reference to an embodiment of FIG. 12A, for a given set of departure dates, the calendar views 1210 display pricing information 1221 in each calendar day 1224. In the example shown, the pricing information 1221 corresponds to pricing of airfare (as identified from the retrieved airfare) that satisfies some pricing criteria, for individual dates that comprise the calendar view 1210. For example, the lowest priced available fare for the particular day may be displayed by the pricing information 1221. Alternatively, the pricing information 1221 may reflect, for example, an average price of some or all airfares available on the particular day, or the lowest price for airfare under some criteria. Specific examples of criteria for pricing information include (i) lowest airfare on a particular day for a class of airfare (e.g. business class or first class); (ii) lowest price by airline; or (iii) lowest price for non-stop or 1-stop to destination. Other criteria for determining which pricing information to display may also be used.

In an embodiment, pricing information 1221 is determined for each date in a range of dates. The range of dates may themselves be determined from a preliminary date of interest, as indicated by, for example, input from a user, online content or other sources. For example, a user may initiate a search for airfare on a particular route, and specify a preliminary date of interest. Such a search may thus provide input and criteria that specifies an destination, point of origin, and a departure date. The results of the search may provide departure dates from January 15$^{th}$, but the user may also select an alternative calendar view that displays pricing information 1221 (e.g. lowest airfare of specified route) for each date in (i) the remaining months of January, or (ii) a range of dates that include days before and/or after the specified (or preliminary) date of interest. The resulting calendar view 1210 may represent pricing information 1221 on individual dates, including numerous dates not specified by the user in his original search, and the pricing information may represent, for example, the lowest priced fare available on that particular date for the route specified by the user. Alternatively, the pricing information can be determined from, for example, a month of departure.

As an addition or alternative, individual dates in the range of dates, as determined from the preliminary date of interest (e.g. a range of dates about the preliminary date of interest) may be marked with prominence if the individual dates contain airfares that are cheapest (or best satisfy the pricing criteria) for the range of departure dates. In FIG. 12A, for example, the departure dates of the 19$^{th}$, 20$^{th}$, 26$^{th}$, 27$^{th}$, 2$^{nd}$ and 3$^{rd}$ contain airfares for the user's specified route (e.g. San Francisco to Chicago) that are lowest price. These dates are further marked in prominence with shading and color. The user can then reconsider his departure date based on the calendar presentation of pricing information.

In some variations, the pricing information 1221 may be omitted in some or all dates of the calendar, but markings of prominence may be used instead to guide the user in selecting a particular departure date.

According to an embodiment, the calendar view 1210 is displayed with additional summary calendar tabs 1218. Each summary calendar tab 1218 may provide a link to another month or calendar segment. Additionally, one or more embodiments provide that each calendar tab 1218 displays the lowest priced fare (or other criteria) for the particular month of that tab. Thus, for example, the user may view other months (e.g. February or March) and also view, in the tab, the lowest price for airfare on the particular route in that month.

FIG. 12B illustrates a variation in which a sequence of calendar views containing pricing information is displayed for a particular route, according to an embodiment. The calendar views 1230, 1232 may represent calendar dates for a departure and return flight. Many airfares are purchased as round-trips, but the price of the round-trip as a whole may vary depending on the travel dates of both the departure and the return. An embodiment provides that when roundtrip airfare for a particular route is selected for a particular date (a preliminary date of interest), an initial departure calendar view 1230 is presented to the user that displays pricing information 1221 for individual dates that comprise a range of dates about the preliminary date of interest. Individual dates with the lowest priced fares may be marked in prominence.

From the departure calendar 1230, the user can select a particular date (e.g. the 20$^{th}$). FIG. 12B illustrates that once the user selection of the particular date is made, the return calendar is presented or populated with pricing information 1231 for the roundtrip fare, given the previously selected departure date and the identified return date. As an alternative or addition, each of the departure dates and return dates can include pricing information 1231 for departure/return legs that are valued as direct flights.

The return calendar 1232 may display pricing information 1231 for return dates that are based on the selected departure date (20$^{th}$). In the example shown, the return dates that are provided pricing information 1231 include the departure date (i.e. the 20$^{th}$), and several days (e.g. one week, ten days, two weeks etc.) after the departure date. Return dates that precede the selected departure date are not populated with pricing information 1231. In some cases, the departure date also affects the price of the return leg, and the price of the return leg can (in some cases) depend on the selected departure date. As with the departure calendar 1230, the return calendar 1232 may place in prominence the dates that have the lowest priced fares (given the selected departure date). In this way, the combination of departure and return calendars 1230, 1232 serve to guide the user in selecting departure and/or return dates based on pricing information, such as lowest prices for selected route on possible travel dates.

With reference to embodiments of FIG. 12A and FIG. 12B, the pricing information 1221, 1231 can be selectable to initiate a search for (or retrieval) of the fare associated with the displayed price. In some embodiments, the pricing information on each date is associated with criteria to initiate a live search that should generate the route with the lowest price. In some instances, the lowest price of the live search may not match that of the displayed price, because the displayed price on the calendar may be dated (by minutes or hours). But the link of the pricing information 1221, 1231 may be associated with data to enable search or retrieval of the fare that is likely to produce the lowest priced fare for the particular calendar date.

As another variation, the individual dates of the calendar may be individually selectable in order to generate a search or retrieval for fares that contain as criteria a travel date identified by the selected date.

With further reference to FIG. 12B (as well as FIG. 12A), individual dates (or units) of the displayed calendars 1230, 1232 can be graphically distinguished to mark pricing indicators. For example, color or shading may be used to mark (i) the date in the calendar that contains the lowest priced fare (e.g. dark green), and (ii) the date in the calendar that is associated with pricing information that satisfies a second criteria. For example, the second criteria may correspond to the second lowest price in a given calendar range, or prices that fall within some threshold of the minimum price in the calendar period (e.g. within ten dollars of lowest price).

Calendar views such as described may be generated in response to various events. For example, embodiments described herein generate calendar as a mechanism for providing a calendar-start for a user initially entering terms for identifying routes and/or dates. As an addition or alternative, the various calendar presentations and views may be generated to (i) depict available dates for promotional fares or prices, and (ii) alternative views for summary or matrix, to facilitate alternative searching mechanisms that prioritize minimizing price by altering travel dates. These and other embodiments are described in more detail below.

Tabulating Matrix for Presenting Roundtrip and Return Legs

As described previously, embodiments such as described with FIG. 10 may formulate search queries in matrix form, in order to tabulate information for a plurality of travel products on a given route and day. By doing so, a system may identify favorable prices for routes based on a date range, so as to enable a flexible traveler to consider alternating flight dates to save money.

Figure 13A:
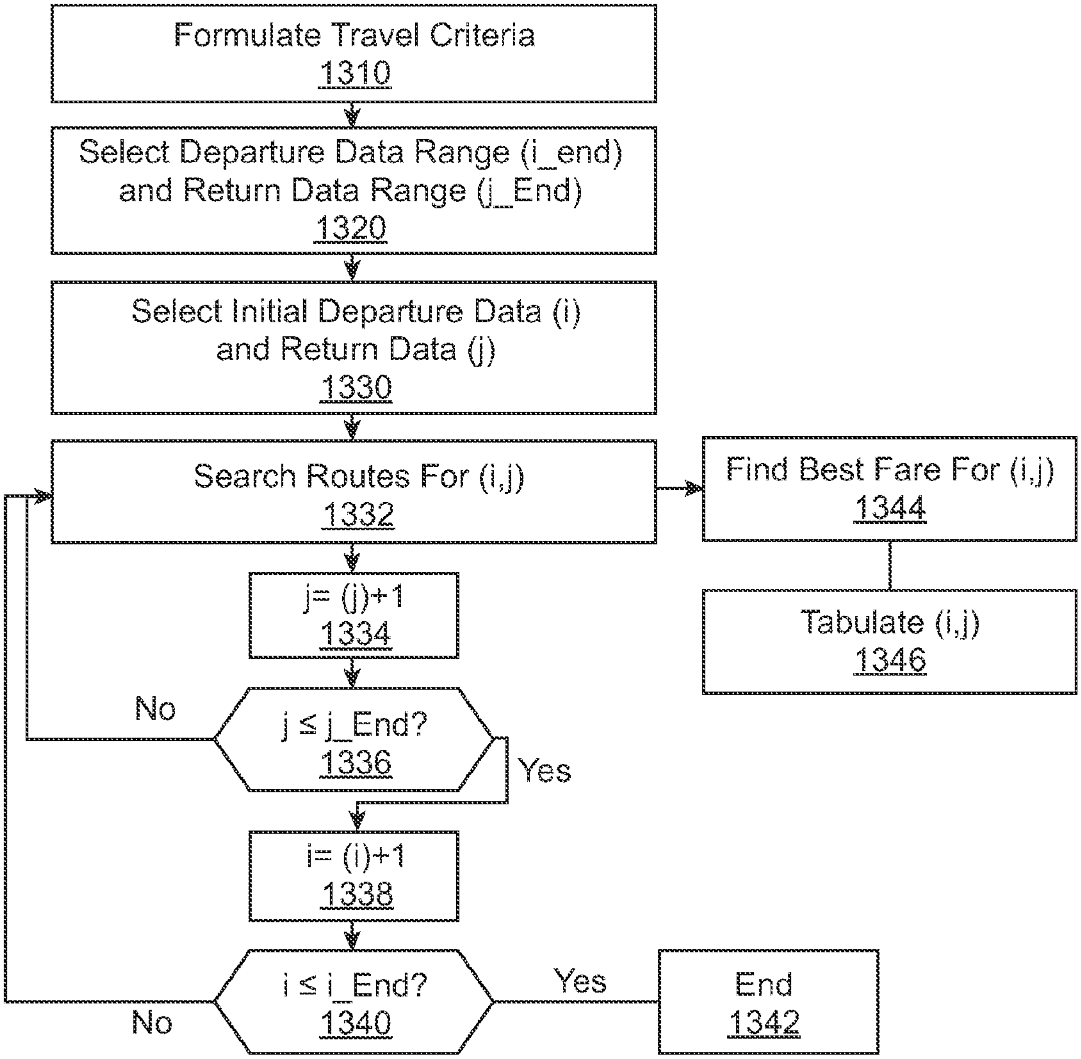
FIG. 13A illustrates a process for executing multiple queries for airfare to tabulate a matrix of pricing information that accommodates a range of departure and return dates, under an embodiment.
Figure 13B:
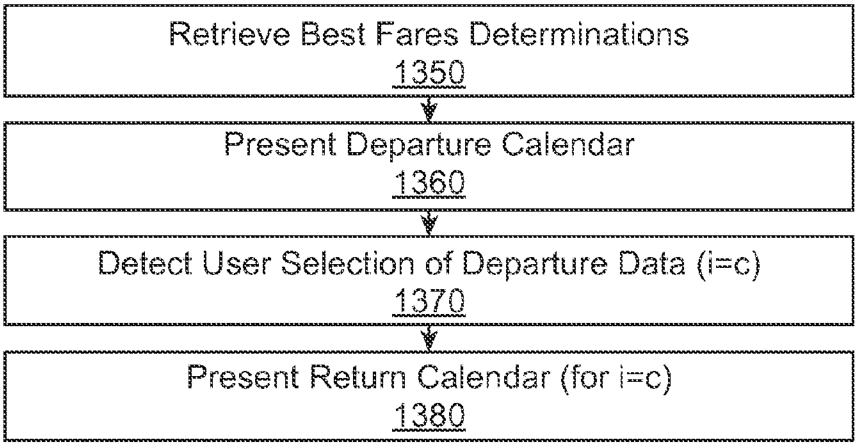
FIG. 13B illustrates use of a tabulated matrix in order to generate calendar views for departure and return legs of airfare (e.g. roundtrip flights), under an embodiment

According to an embodiment, FIG. 13A illustrates a process for executing multiple queries for airfare to tabulate a matrix of pricing information that accommodates a range of departure and return dates, under an embodiment. FIG. 13B illustrates use of a tabulated matrix in order to generate calendar views for departure and return legs of airfare (e.g. roundtrip flights), under an embodiment. A method such as described with FIG. 13A and FIG. 13B may be implemented using a system such as described with FIG. 10. Accordingly, reference may be made to elements described with FIG. 10 in order to illustrate a suitable element or component for performing a step or sub-step being described.

A method such as described with FIG. 13A may be implemented for either cached or live searches, depending on the application. In an embodiment, travel criteria is determined for roundtrip fares, corresponding to destination, points of departure, and travel dates (1310). For cached searches, the travel criteria may be based on most popular routes (e.g. the 400 most popular roundtrip routes). As part of determining travel criteria, a range of departure dates (i_end) is determined. For cached searches, the departure dates may be determined from (or based on) present day forward. For live searches, the range of departure dates can be determined from a preliminary date of interest. For example, a user may specify an indicated departure date. The range of departure dates may then include a set number of days preceding the date of interest, and a set number of days following the indicated departure date.

The return or arrival dates may be determined from, or made to coincide with the departure dates (1320). For example, in a cached searches, the range of return dates may correspond to a set period of 15 days from the present day. In a live search, the range of return dates may be determined from individual dates in the range of departure dates. As an example, for each departure date, a corresponding range of return dates may be determined that corresponds to shortest assumed return date (e.g. next day) or longest assumed return date (e.g. ten days after departure date).

Pricing information for routes is then determined by initializing the travel dates (i,j) (1330). In an embodiment, routes are searched that satisfy the travel criteria and correspond to the earliest departure date and the soonest return date (e.g. same day departure, next day return). With departure/return date selection, airfares are searched (1332) for the identified route. As described with prior embodiments, a meta-search may be performed to determine airfares from multiple sources (e.g. online search engines for travel products), as well as provided by multiple providers (airlines).

Accordingly, for the initial departure date, steps 1332-1342 provide that roundtrip fares are searched for dates as follows: (i) the initial departure/return dates; (ii) all return dates for the initial departure date; (iii) following departure date(s) and all return dates for that departure date. The best roundtrip fare is determined for round trip fares that have departure dates (i) and return dates (j) (1344). Thus, a determination is made for the best round trip fare available for departure on each departure date, and return on each return date. The best fares are then tabulated in a matrix (1346).

In implementation, searches for roundtrip fares, as identified in steps 1332-1342, are implemented in parallel (rather than iteratively). In one implementation, individual queries can be structured to specify departure and return parameters in parallel. For example, each query can submit a matrix (e.g. 3 by 5) of departure and return dates to various resources for determining roundtrip fares. Thus, the determination of departure dates (i) and return dates (j) may be performed in advance, for cached or live queries. The queries may then be structured to implement the departure/return dates in parallel.

As mentioned, in some instances, the range of return dates may be smaller than the range of departure dates. For example, in cached searches, the range of departure dates may range 90 days from present day (or next day), and the range of return dates may range 15 days from next day. In such instances when the user selects departure date that is beyond that cached for return date, a live search is in actuality performed when the user selects his preferred departure date. The results for the departure/return date are then actually the results of a "live search".

According to a method of FIG. 13B, system 1000 (FIG. 10) retrieves best fare determinations for a particular fare in a particular date range (1350). The retrieval may be from a cached source in instances when the user's selection is for a popular route, or from a live source in instances when the user's selection is not cached.

A departure calendar may be displayed to a user, depicting prices of available roundtrip fares available on each departure date (1360). A matrix such as tabulated in (1346) may be used. A user may select one of the departure dates (1370), in which case the return calendar is presented to the user (using tabulated or matrix results) (1380).

Figure 14B:
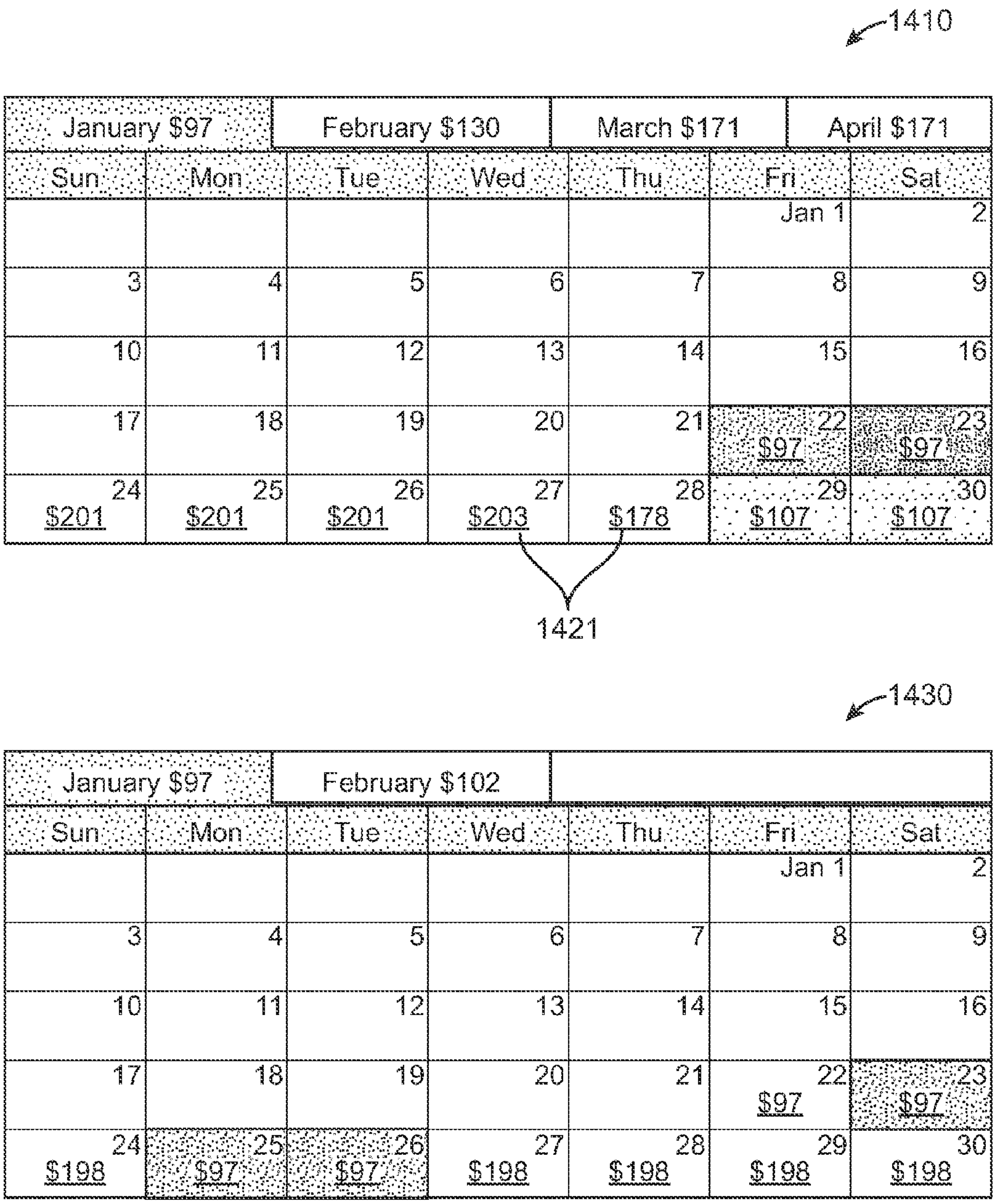

FIG. 14A through FIG. 14C illustrate calendar views that depict pricing information for a given route, in which the pricing information for a return leg (see FIG. 14B and FIG. 14C) depends on the selected departure date. In the example provided, FIG. 14A shows in a departure calendar 1410, pricing information 1421 for a roundtrip fare. The pricing information 1421 represents the lowest priced roundtrip fare available on the particular departure date. But in many cases, the best available roundtrip fare on a given departure date is not available for all return dates, just some (or even one return date). In FIG. 14B, results are shown on a return calendar 1430. In the example shown, the user selects January 23, with the best roundtrip fare falling on $23^{rd}$ (same day return), $25^{th}$ and $26^{th}$. In this example, the user can thus purchase the $97 roundtrip fare (initially depicted in the departure calendar 1410) for departure date of the $23^{rd}$, and return date of either the $23^{rd}$, $25^{th}$ or $26^{th}$. In the example of FIG. 14C, the return calendar 1430 depicts the results for when the user's selection is for the $22^{nd}$. In this example, the $97 roundtrip date is only available on the $25^{th}$ and the $26^{th}$, not the $23^{rd}$. Other prices (i.e. not just the lowest price) may also be varied for the earlier departure date. The variations in what combinations of departure/return legs produce priced fairs is determined through tabulating results of queries, such as described with prior embodiments (see e.g. FIG. 13A).

Calendar Start to Search

Still further, some embodiments provide a calendar-start interface for enabling search of airfare on a particular route. The calendar-start may focus on providing the user with results that are centric about optimizing (e.g. reducing) the airfare based on the user's selection of travel dates. From the calendar, the user can select and re-select dates to optimize a trip (particularly a roundtrip fare) based on the best available price.

Figure 15B:
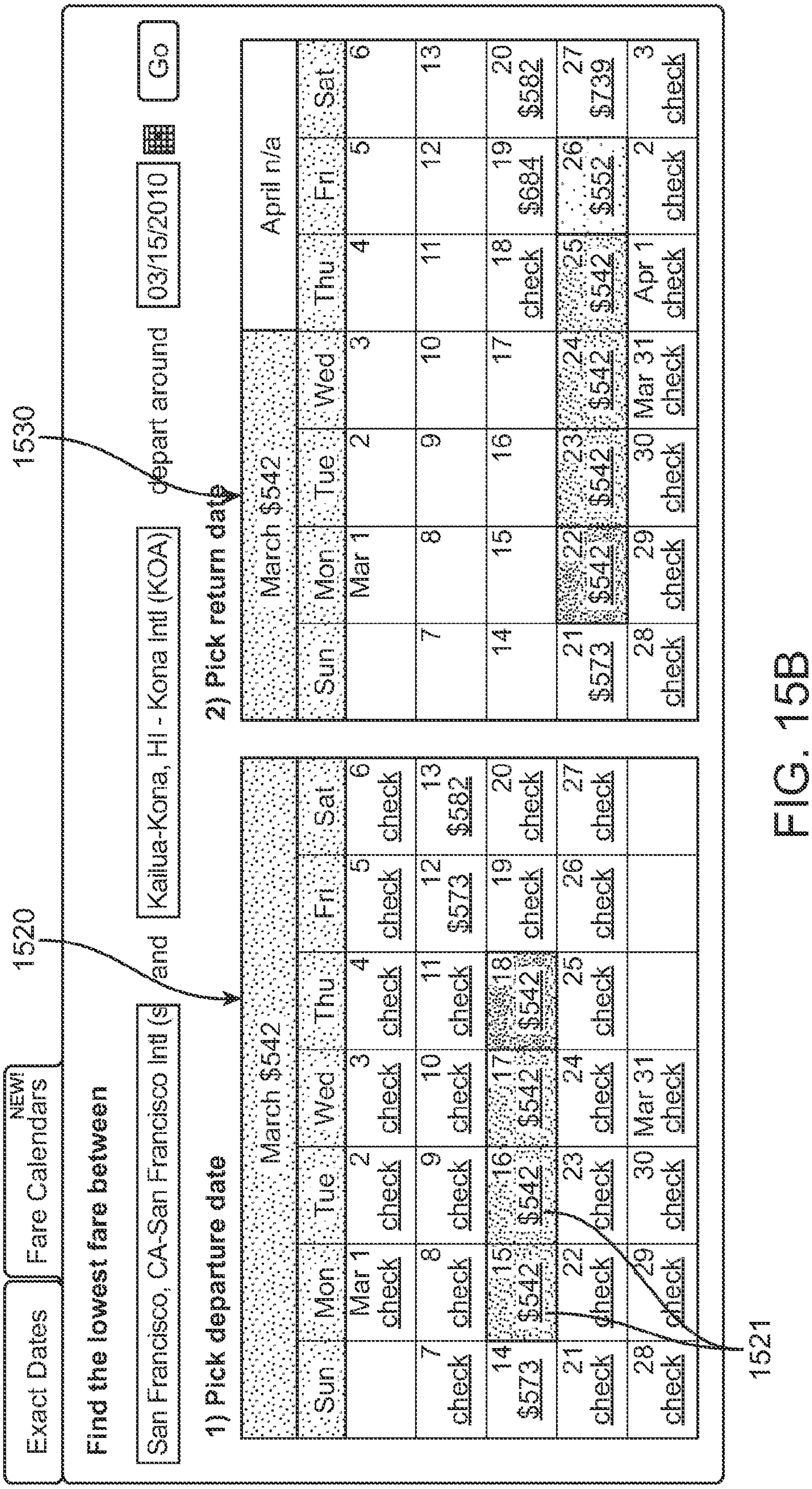

With reference to FIG. 15A and FIG. 15B, the calendar-start interface includes fields 1510, 1512 for prompting the user to enter route information (destination, point of departure). An optional field 1516 for a preliminary date of departure may also be included. The user may enter the information to trigger either a cached search retrieval or a live search for pricing information of roundtrip fares. A departure calendar 1520 may be populated with pricing information 1521 that reflects the lowest priced roundtrip airfare for the particular route, available on that departure date (depending on what departure date the user selects). The user may select a departure date to see the return calendar 1530. The user can then determine whether the combination of departure and return dates is desirable, based on pricing information for the roundtrip fare on the selected dates. The user can, from the same interface, select a new departure date and compare roundtrip fares. As with prior embodiments, the lowest priced fare for an entire range may b separately marked (e.g. in color), as well as other fares that satisfy some threshold or criteria (e.g. within ten dollars of lowest price).

Figure 16A:
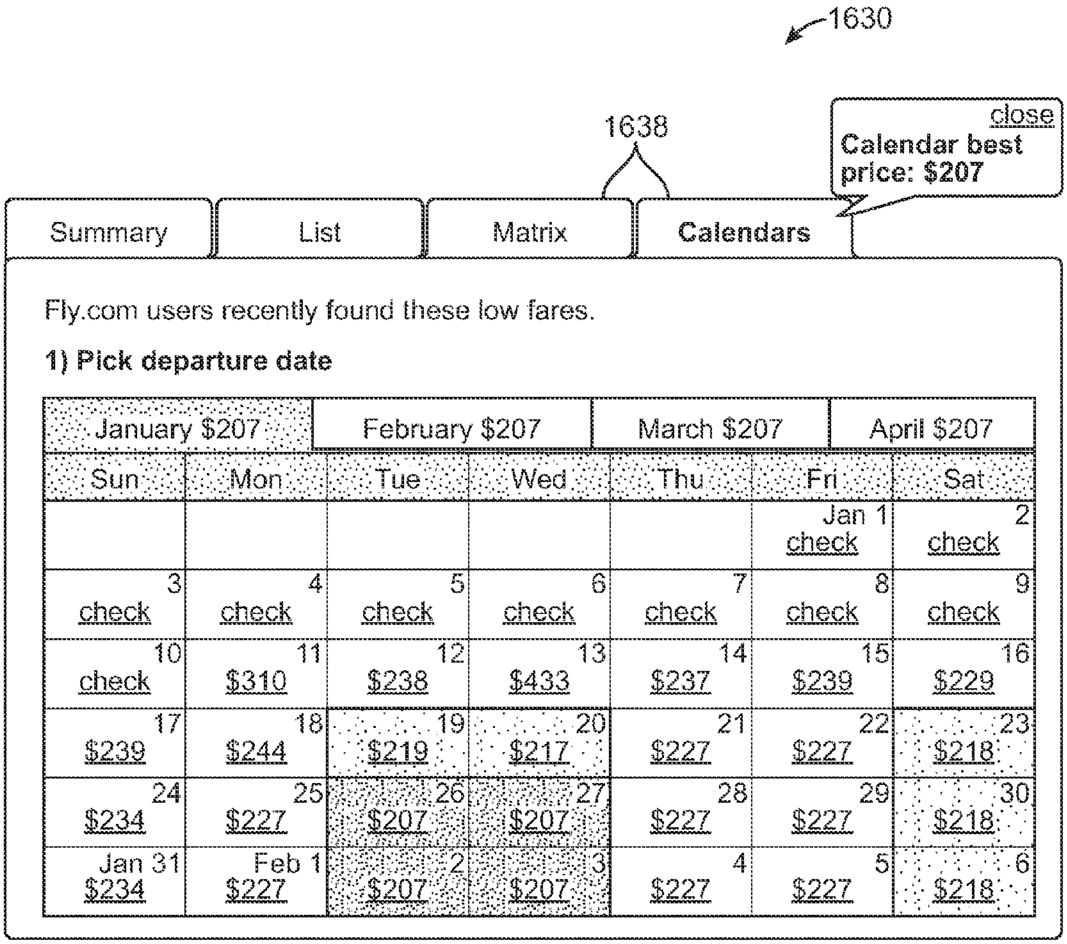

FIG. 16A through FIG. 16C illustrates a multi-view presentation for presenting pricing information for products using search results, according to one or more embodiments. In the examples provided by FIG. 16A through FIG. 16C, alternative presentations are displayed for airfare, corresponding to a calendar view, a summary view and a matrix view, where each of the views are linked to one another to facilitate the user's research for best fares. In FIG. 16A, the calendar view 1630 is displayed linked to other views for presenting search results for travel products. The calendar view 1630 is linked by tabs 1638 to, the alternative views, displayed as the summary view 1640 (see FIG. 16B; and also described with other embodiments), as well as a matrix view 1650 (see FIG. 16C). Thus, search result for a particular fare, as retrieved for multiple airlines and/or search engines, can be presented to the user in various formats. As mentioned with other embodiments, the summary view 1640 presents consolidated entries 1662 in list form of travel products (e.g. fares) that match destination/date criteria specified from a user (or from another source, such as a programmatic source). In one embodiment, each entry 1662 identifies a provider (e.g. an airline, or alternatively a source (e.g. online booking engine) of purchase) for the fare, as well as known price points for individual fares. Moreover, designations and pricing information for different types of fares (e.g. business class, coach) can be displayed. Each entry 1662 is consolidated in that it shows pricing information 1661 (e.g. lowest price) by provider 1663 and fare type 1665, and includes a link 1652 to search for fares from that specific carrier that match a specified or determined search criteria. The link 1652 includes a information, such as the number of fares available for purchase from the provider that match the particular search criteria. From the summary view, the user can have access to a link to other views, including to the calendar view. The calendar view link 1667 is displayed with pricing information 1669 to a lowest fare in a given calendar period. The pricing information 1669 is presented to inform the user about the value and presence of a lowest fare for the user's selected route. In seeing the information 1669, some user's may be incentivized to parameterize their travel dates based on lowest price. Thus, if the user is willing to change the date of his travel, he may have interest to view the calendar view (via link 1667) in order to book the airfare that is lowest priced over the given calendar period.

FIG. 16C illustrates the matrix view 1650 for presenting pricing information for fares of a particular route, according to an embodiment. The matrix view 1650 provides another mechanism for providing pricing information to users with information that is pertinent to their selection and purchase. In the example shown, the matrix view 1650 includes a row-wise parameters 1672 that indicate product parameters, such as whether a fare is non-stop, one-stop, or two-stop. Other product parameters, such as product class (coach, business class etc.) may also be used. The column-wise parameters 1674 indicate providers, such as airlines or other sources for procuring fares (e.g. booking engines). The resulting matrix is populated with pricing information 1671, to show, for example, the lowest price fare, given the particular product parameter and provider. The user can toggle between the various views to see summary view 1640 (e.g. carrier, price range, product class), calendar view 1630 (best price or price range by date), and/or matrix view 1650 (e.g. pricing information by product class and carrier).

Calendar View with Content and Advertisement

Calendar and alternative views such as described with embodiments may be implemented in connection with displaying content for travel products, including travel advertisements. In some embodiments, the calendar views may display travel product information to supplement or enhance displayed travel content. For example, an advertisement for a hotel may include a calendar view in order to display airfares to the destination of the hotel.

FIG. 17 illustrates online content that includes a listing of pricing information with views such as described with one or more embodiments. In FIG. 17, travel content 1780 may be in form of advertisement, commercial content, journalistic, blog form or otherwise. As travel content 1780, the content may include text that specifies, for example, a location and date or range of dates. In the specific example shown, an advertisement is displayed for a lodging in a particular city (e.g. Chicago), on a particular date.

According to some embodiments, the content 1780 is programmatically scanned or otherwise analyzed (e.g. through metadata) to identify the pertinent location of the content, as well as the dates specified by the content. For travel content, the dates indicate when, for example, the lodging is being offered for discount. Criteria may be determined from the scan that indicates (i) a destination, and (ii) date of travel. In an embodiment, routes from various points of departures, to the destination on the date of travel are identified and searched, then presented to viewers. In one embodiment, a summary or table view 1782 of the various rates for different routes 1784 (assuming different points of departure) are displayed on or concurrently with the online content. A user can select his desired route 1784, and then be navigated to, for example, a calendar view (such as described with FIG. 12A and FIG. 12B) for the selected route, using a travel date indicated by the content. In this way, the user can view pricing information for airfare to a location of interest (e.g. the location of the lodging) on the date that the lodging is being offered at a special price.

With advertisements of travel content in particular, numerous conditions and restrictions exist regarding the date of use. For example, hotel advertisements often list low weekday rates, and more specifically, low week day rates for specific weekdays (e.g. Tuesdays and Thursdays), excluding certain weeks entirely. An advertisement for such a travel product may intend to draw interest and enthusiasm, but the rules and restrictions (the "fine-print") can negatively impact user experience and perception of the establishment. To facilitate uses, one or more embodiments provide calendar views of pricing information for an advertised product, in order to enable users to receive updated information about the travel product offer, as well to know with quickly the dates of the promotion, and the rates of the non-promotion dates.

FIG. 18A and FIG. 18B illustrate an embodiment in which travel content (e.g. advertisement) promoting a particular travel product is presented with a calendar view to display rates and information about the promoted travel product, according to an embodiment. Travel content 1860 (FIG. 18B) can be scanned, processed or analyzed to identify travel input or criteria (1810). In the case of lodging, the travel input may correspond to the destination (e.g. location of the lodging). For airfare, for example, the route (destination and point of departure) may be determined. In one implementation, the travel content is processed by integrating or packaging a query (or query result) with the content at the time the content is subjected to a campaign or distributed.

In determining the input or criteria, applicable dates may also be assumed or determined (1820). To maintain pertinence, the applicable dates may be assumed to be within a range identified from the content. For example, the first and last dates of a promotion may be used to determine applicable dates. Alternatively, the present day may be used (e.g. 3 months from present).

From the inputs and date range, search results are retrieved from one or more corresponding online sources (1830). By performing such a live search, the results may reflect whether a promotion is available. Additionally, even if the promotion is available, the results for non-promotion days may be determined and tabulated (as described with prior embodiments).

The content is then presented with a calendar that displays pricing information for the particular travel product of the promotion or content (1840). FIG. 18B illustrates an example of promotional content for travel products (e.g. flights to a particular destination) that have low rates. The user can select links 1872 to navigate and see calendar presentations that depict (i) whether the promoted rate is still available, (ii) schedule of rates, including rates of non-promoted dates.

With reference to an embodiment of FIG. 17, similar calendars can be generated for lodging promotions. The calendars may be provided with link access, or presented concurrently with the displayed content.

With further reference to advertisement and promotional content such as described above, some embodiments incorporate a calendar view or presentation to inform the user that even a better price for the promoted fare/product exist. For example, a travel product may be linked with a calendar presentation (as described with FIG. 18A and FIG. 18B), and the presentation of the calendar may be linked to a trigger that detects if a price in the calendar is (or is potentially) better than that listed in the content. If the determination is that a better price exists (whether because the search is more recent than the price advertised, provided by an alternative provider, or because an alternative date is available), a message may be communicated to the user to the effect that a better fare or price may exist.

Computer Architecture

Figure 19:
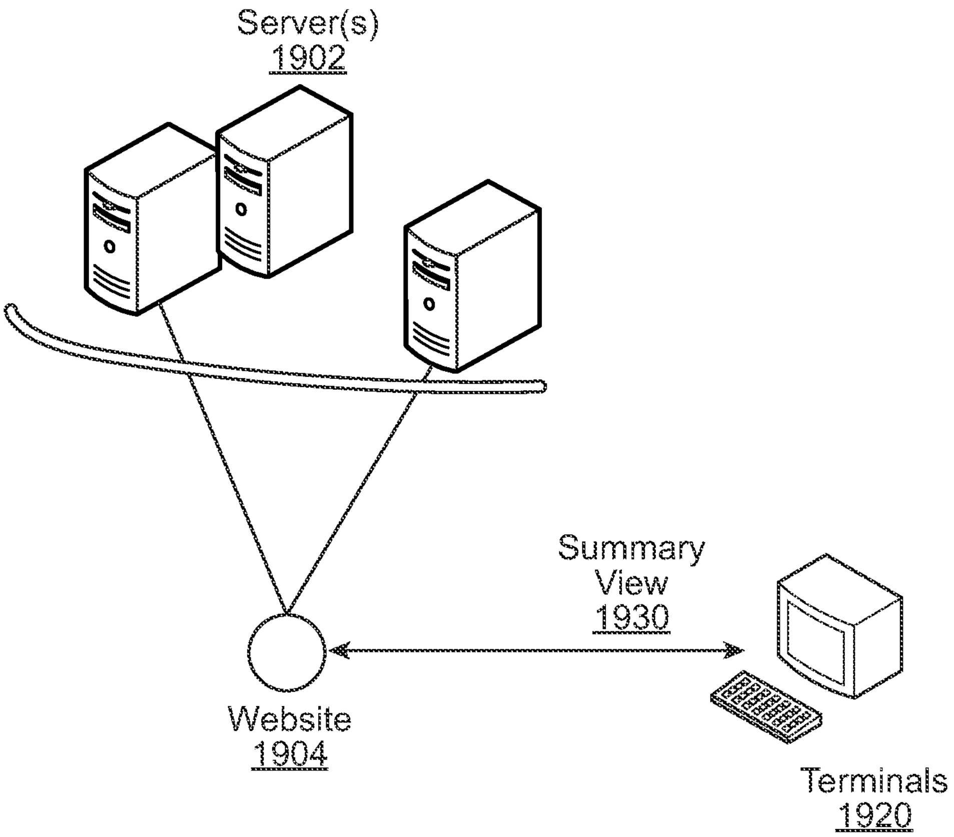
FIG. 19 illustrates a network architecture on which one or more embodiments may be implemented.

FIG. 19 illustrates a network architecture on which one or more embodiments may be implemented. In FIG. 19, a website 1904 is hosted or provided through one or more servers 502 that operate on a network. The website 1904 may be accessed by terminals 520 of the public, on which browsers are operated to render network content. In one embodiment, a system such as described with any of the prior embodiments (e.g. see FIG. 1) is implemented on the servers 1902. The servers 1902 may communicate with other sites where search engines (or meta-search engines) for use in generating a summary view 1930 are provided. The summary view 1930 may be generated for individual terminals 1920, for display using browsers.

Conclusion

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computer-implemented method for presenting search results for airfares, the method comprising the steps of:

(a) prompting, by one or more processors, a user to enter travel criteria for airfares on a calendar start interface;

(b) receiving user input that identifies (i) the point of departure and (ii) the destination;

(c) in response to said received user input, displaying, by said one or more processors, a sequenced calendar interface; said sequenced calendar interface including a departure calendar, the departure calendar including a plurality of departure dates, each of the plurality of departure dates including pricing information indicating a lowest price roundtrip fare available on that departure date as between the point of departure and the destination;

(d) selecting, via said one or more processors, one of the individual departure dates from the departure calendar;

(e) in response to said user selecting one of the departure dates, displaying by one or more processors, a return calendar, said return calendar including a plurality of return dates that span multiple weeks, each of the plurality of return dates being displayed with pricing information indicating a lowest price roundtrip fare that departs on the selected departure date and returns on that return date;

wherein the pricing information for at least one or more of the plurality of return dates is different than the pricing information of other return dates in the plurality of return dates; and wherein at least one of the individual return dates in the plurality of return dates includes the lowest price roundtrip fare indicated as being available on the selected departure date as between the point of departure and the destination.

2. The method of claim 1, wherein at least one of steps (c) and (e) include retrieving a search result for the roundtrip fares from a cached source.

3. The method of claim 1, wherein step (c) includes retrieving a search result for the roundtrip fare from a cached source, and step (e) includes performing a live search for a search result that identifies the pricing information for one or more of the return dates.

4. The method of claim 1, wherein performing steps (c) and (e) include (f) determining whether a search for pricing information and availability of the route specified by the input has been previously performed and cached.

* * * * *